US012580354B2

(12) United States Patent
Zheng et al.

(10) Patent No.: US 12,580,354 B2
(45) Date of Patent: Mar. 17, 2026

(54) ADAPTER AND RAIL SOCKET

(71) Applicant: GONEO GROUP CO., LTD., Cixi City (CN)

(72) Inventors: Lihe Zheng, Cixi City (CN); Han Cheng, Cixi City (CN); Huijiu Wang, Cixi City (CN); Jingshan Zheng, Cixi City (CN); Chao Yu, Cixi City (CN)

(73) Assignee: GONEO GROUP CO., LTD., Cixi City (CN)

( * ) Notice: Subject to any disclaimer, the term of this patent is extended or adjusted under 35 U.S.C. 154(b) by 549 days.

(21) Appl. No.: 17/802,862

(22) PCT Filed: Mar. 23, 2021

(86) PCT No.: PCT/CN2021/082467

§ 371 (c)(1),
(2) Date: Aug. 26, 2022

(87) PCT Pub. No.: WO2022/016893

PCT Pub. Date: Jan. 27, 2022

(65) Prior Publication Data

US 2023/0163542 A1 May 25, 2023

(30) Foreign Application Priority Data

Jul. 22, 2020 (CN) ......................... 202010712396.8
Jul. 22, 2020 (CN) ......................... 202021463345.8
(Continued)

(51) Int. Cl.
*H01R 25/14* (2006.01)
*H01R 13/502* (2006.01)
(Continued)

(52) U.S. Cl.
CPC ........... *H01R 25/14* (2013.01); *H01R 13/502* (2013.01); *H01R 13/629* (2013.01); *H01R 13/639* (2013.01); *H01R 24/76* (2013.01)

(58) Field of Classification Search
CPC ...... H01R 25/00; H01R 25/14; H01R 25/142; H01R 13/629; H01R 13/639; H01R 24/76
See application file for complete search history.

(56) References Cited

U.S. PATENT DOCUMENTS 3,960,426 A 6/1976 Heritage
4,626,052 A 12/1986 Rumble
(Continued)

FOREIGN PATENT DOCUMENTS

CN 1736007 A 2/2006
CN 102299454 A 12/2011
(Continued)

OTHER PUBLICATIONS

International search report of PCT application No. PCT/CN2021/082480 issued on Jun. 28, 2021.
(Continued)

*Primary Examiner* — Edwin A. Leon
*Assistant Examiner* — Paul D Baillargeon
(74) *Attorney, Agent, or Firm* — Knobbe, Martens, Olson & Bear, LLP

(57) ABSTRACT

An adapter includes a socket portion and a power-taking portion. The power-taking portion is connected to a bottom of the socket portion, and the power-taking portion is configured to enter an electrified guide rail to take power. The socket portion includes a socket portion body, a fixed support, a locking member and an unlocking member. The fixed support is disposed at a bottom of the socket portion body. The locking member runs through the fixed support, and the locking member is configured to be limited within
(Continued)

the electrified guide rail in a locked state and to be released from the electrified guide rail in an unlocked state. The unlocking member is connected to the fixed support, and the unlocking member is configured to enable the locking member to be switched between the locked state and the unlocked state.

20 Claims, 17 Drawing Sheets

(30) Foreign Application Priority Data

Aug. 19, 2020 (CN) ......................... 202010839080.5
Aug. 19, 2020 (CN) ......................... 202021744535.7

(51) Int. Cl.
*H01R 13/629* (2006.01)
*H01R 13/639* (2006.01)
*H01R 24/76* (2011.01)

(56) References Cited

U.S. PATENT DOCUMENTS 5,426,567 A 6/1995 Opeka
5,759,051 A 6/1998 Cancellieri et al.
5,759,251 A 6/1998 Nakamura et al.
6,079,992 A 6/2000 Kuchar et al.
6,328,597 B1 12/2001 Epps
9,673,583 B2 * 6/2017 Hudson .................... H01R 4/64
9,837,761 B1 12/2017 Hardy et al.
10,194,296 B2 1/2019 Tetreault et al.
11,031,730 B2 6/2021 Mitter et al.
11,322,867 B1 5/2022 Davidsz et al.
2003/0040228 A1 2/2003 Finzer et al.
2006/0116011 A1 6/2006 Sinclair
2013/0137306 A1 5/2013 Huang
2014/0213090 A1 7/2014 Todd, II et al.
2019/0372285 A1 12/2019 Grünberger
2020/0051711 A1 2/2020 Ware et al.
2020/0259347 A1 8/2020 Pereira et al.
2022/0396162 A1 12/2022 Weyrauch et al.
2023/0101661 A1 3/2023 Binyu et al.
2023/0108383 A1 4/2023 Zuo

FOREIGN PATENT DOCUMENTS

CN 203386996 U 1/2014
CN 104218388 A 12/2014
CN 104993340 A 10/2015
CN 205752702 U 11/2016
CN 205900989 U 1/2017
CN 206022718 U 3/2017
CN 105826774 B 6/2017
CN 208173939 U 11/2018
CN 109004477 A 12/2018
CN 208352662 U 1/2019
CN 304980549 S 1/2019
CN 109378612 A 2/2019
CN 209184155 U 7/2019
CN 305300646 S 8/2019
CN 209880966 U 12/2019
CN 110676644 A 1/2020
CN 210111668 U 2/2020
CN 210224498 U 3/2020
CN 210326385 U 4/2020
CN 210350315 U 4/2020
CN 210576677 U 5/2020
CN 210576697 U 5/2020
CN 210576894 U 5/2020
CN 210576900 U 5/2020
CN 210779362 U 6/2020
CN 211088687 U 7/2020
CN 111786185 A 10/2020
CN 111786186 A 10/2020
CN 111786213 A 10/2020
CN 111817085 A 10/2020
CN 212462276 U 2/2021
CN 212751294 U 3/2021
CN 113823956 A 12/2021
EP 2282379 A1 2/2011
EP 3588696 A1 1/2020
JP S502396 Y1 1/1975
JP S60170990 U 11/1985
JP S6370685 U 5/1988
JP H01217874 A 8/1989
JP 2002198145 A 7/2002
JP 2006211845 A 8/2006
JP 2008251502 A 10/2008
JP 2024015084 A 2/2024
JP 2024020568 A 2/2024
WO 2017007420 A1 1/2017

OTHER PUBLICATIONS

International search report of PCT application No. PCT/CN2021/082467 issued on Jun. 28, 2021.
China National Intellectual Property Administration, First office action of Chinese application No. 202010778679.2 Issued on Apr. 7, 2021, which is foreign counterpart application of this US application.
China National Intellectual Property Administration, First office action of Chinese application No. 202010778693.2 Issued on May 6, 2021, which is foreign counterpart application of this US application.
China National Intellectual Property Administration, Second office action of Chinese application No. 202010778693.2 Issued on Feb. 7, 2022, which is foreign counterpart application of this US application.
China National Intellectual Property Administration, Decision of Rejection of Chinese application No. 202010778693.2 issued on May 26, 2022, which is foreign counterpart application of this US application.
Notice of Reasons for Refusal in Japanese application No. 2022-537291 issued on Jun. 12, 2023.
Extended European Search Report in European application No. 21852854.5 issued on Jul. 17, 2023.
Non-final office Action of U.S. application No. U.S. Appl. No. 17/799,858 issued on Sep. 20, 2024.
Notice of Reasons for Refusal of Japanese application No. 2023-200956 issued on Sep. 30, 2024.
Notice of Reasons for Refusal of Japanese application No. 2023-200959 issued on Sep. 30, 2024.
Notice of Reasons for Refusal of Japanese application No. 2023-200960 issued on Sep. 30, 2024.
China National Intellectual Property Administration, First office action of Chinese application No. 202010839080.5 issued on Dec. 10, 2024, which is foreign counterpart application of this US application.
China National Intellectual Property Administration, First office action of Chinese application No. 202010712396.8 issued on Dec. 26, 2024, which is foreign counterpart application of this US application.
Decision of Refusal of Japanese application No. 2023-200960 issued on Feb. 25, 2025.
Decision to Grant a Patent of Japanese application No. 2023-200956 issued on Feb. 25, 2025.

* cited by examiner

ADAPTER AND RAIL SOCKET

CROSS-REFERENCE TO RELATED APPLICATION

This application is a US national stage of international application No. PCT/CN2021/082467, filed on Mar. 23, 2021, which claims priorities to the Chinese Patent Application No. 202010839080.5, filed on Aug. 19, 2020 and entitled "ADAPTER AND RAIL SOCKET", the Chinese Utility Model Patent Application No. 202021744535.7, filed on Aug. 19, 2020 and entitled "ADAPTER AND RAIL SOCKET", the Chinese Patent Application No. 202010712396.8, filed on Jul. 22, 2020 and entitled "ELECTRIFIED GUIDE RAIL AND RAIL SOCKET", and Chinese Utility Model Patent Application No. 202021463345.8, filed on Jul. 22, 2020 and entitled "ELECTRIFIED GUIDE RAIL AND RAIL SOCKET", the disclosures of which are herein incorporated by reference in their entireties.

TECHNICAL FIELD

The present disclosure relates to the field of electrical devices, in particular to an adapter and a rail socket.

BACKGROUND

The rail socket is a mobile socket and includes an electrified guide rail and an adapter. The adapter can be assembled at different positions of the electrified guide rail to take power.

SUMMARY

In one aspect, the embodiment of the present disclosure provides an adapter. The adapter includes a socket portion and a power-taking portion, wherein the power-taking portion is connected to a bottom of the socket portion, and the power-taking portion is configured to enter the electrified guide rail to take power;

- the socket portion includes a socket portion body, a fixed support, an unlocking member and a locking member;
- the fixed support is disposed at a bottom of the socket portion body;
- the locking member runs through the fixed support, and the locking member is configured to be limited within the electrified guide rail in a locked state and to be released from the electrified guide rail in an unlocked state; and
- the unlocking member is connected to the fixed support, and the unlocking member is configured to enable the locking member to be switched between the locked state and the unlocked state.

In another aspect, the embodiment of the present disclosure further provides a rail socket. The rail socket includes an electrified guide rail and any one of the above adapters;

- a top and an inside of the electrified guide rail respectively have an opening and an accommodating cavity which extend along a length direction of the electrified guide rail; and
- the power-taking portion of the adapter is capable of being assembled into the accommodating cavity through the opening, and capable of rotating to a power-taking position in the accommodating cavity to take power.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, the adapter includes a socket portion and a power-taking portion connected to a bottom of the socket portion. The socket portion includes a socket portion body and a fixed support. The fixed support is disposed at a bottom of the socket portion body and cannot rotate relative to the electrified guide rail. During application, the power-taking portion enters the electrified guide rail, and the socket portion body is rotated to drive the power-taking portion to rotate from an assembly position to a power-taking position.

However, in a non-power-taking state, for example, at the assembly position, the adapter is easily driven by an external force to be released from the electrified guide rail.

Embodiments of the present disclosure provide an adapter and a rail socket, which can be configured for solving the problem that the adapter easily falls off from the electrified guide rail. The technical solution is as follows.

A rail socket is a mobile socket and includes an adapter and an electrified guide rail. The electrified guide rail is used for supplying power and the adapter is used for taking power. The adapter is assembled into the electrified guide rail and may slide along the electrified guide rail to take power at any power-taking position of the electrified guide rail. When an external electrical device and the adapter are electrically connected in a plug-in manner and the like, the electrified guide rail, the adapter and the external electrical device form a conductive path to realize the power supply from the electrified guide rail to the external electrical device. Since the adapter in the rail socket is movable, the power-taking manner in which the external electrical device is connected to the adapter is more flexible.

In the related art, the adapter includes a socket portion and a power-taking portion connected to a bottom of the socket portion. The socket portion includes a socket portion body and a fixed support. The fixed support is disposed at the bottom of the socket portion body and cannot rotate relative to the electrified guide rail. During application, the power-taking portion enters the electrified guide rail, and the socket portion body is rotated to drive the power-taking portion to rotate from an assembly position to the power-taking position.

The power-taking portion may freely enter and exit the electrified guide rail when at the assembly position, so that the adapter is easily driven by an external force in a non-power-taking state and separated from the electrified guide rail. That is to say, the adapter is apt to fall off from the electrified guide rail, such that not only is the adapter easily damaged, but also the user experience is poor.

Figure 1:
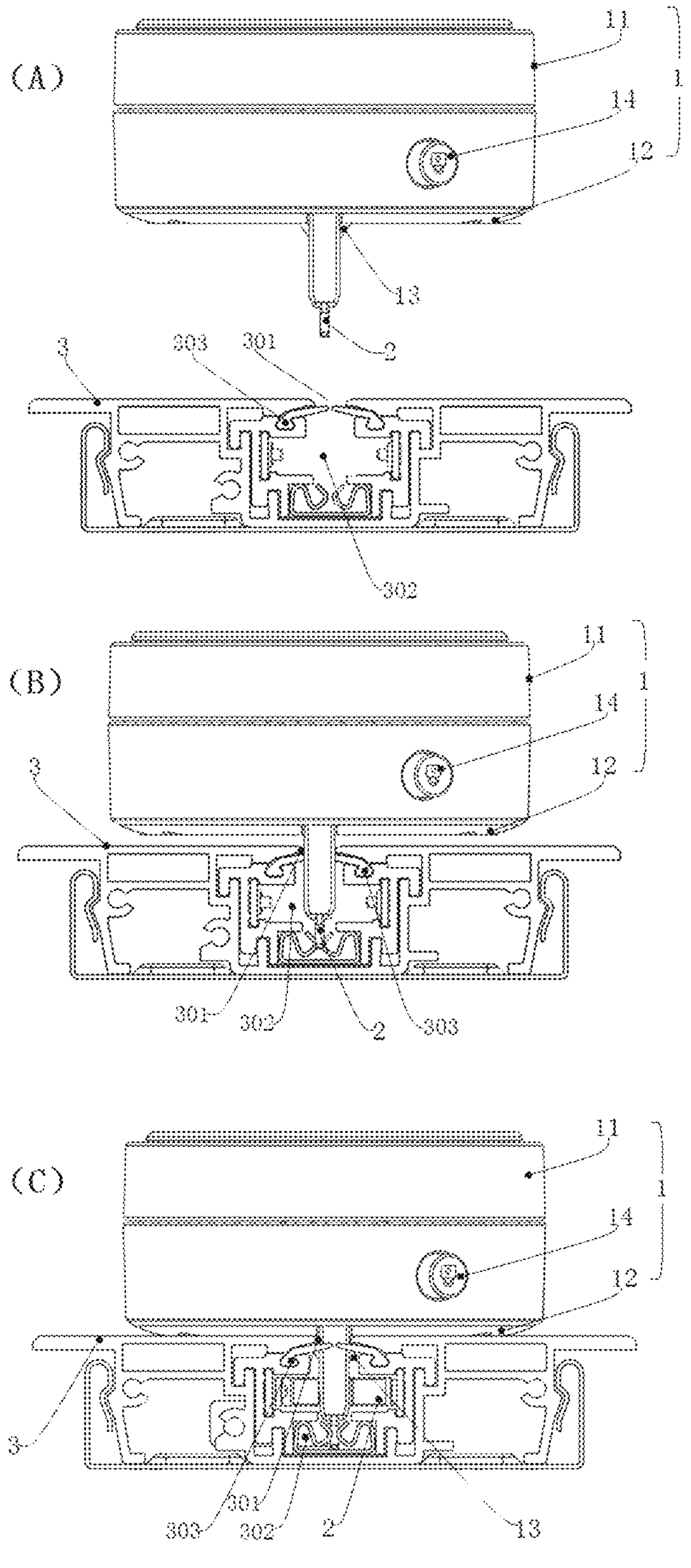
FIG. 1 is a schematic diagram of a plugging-unplugging process of an exemplary pressing-type adapter according to an embodiment of the present disclosure.

The embodiment of the present disclosure provides an adapter. As shown in FIG. 1, the adapter includes a socket portion 1 and a power-taking portion 2. The power-taking portion 2 is connected to a bottom of the socket portion 1, and the power-taking portion 2 is configured to enter the electrified guide rail 3 for taking power.

The socket portion 1 includes a socket portion body 11, a fixed support 12, an unlocking member 14 and a locking member 13. The fixed support 12 is disposed at a bottom of the socket portion body 11 (the fixed support 12 cannot rotate relative to the electrified guide rail 3, while the socket portion body 11 can rotate relative to the electrified guide rail 3). The locking member 13 runs through the fixed support 12, and the locking member 13 is configured to be limited inside the electrified guide rail 3 in a locked state, and to freely enter and exit an opening 301 of the electrified guide rail 3 in an unlocked state. The unlocking member 14 is connected to the fixed support 12, and the unlocking member 14 is configured to switch the locking member 13 between the locked state and the unlocked state.

According to the embodiment of the present disclosure, the adapter is plugged into the electrified guide rail 3, so that the power-taking portion 2 enters the electrified guide rail 3 from the assembly position where the power-taking portion 2 enters and exits the electrified guide rail 3. The power-taking portion 2 is rotated such that it may be rotated to the power-taking position in the electrified guide rail 3. Since the adapter includes the locking member 13 and the unlocking member 14 the locking member 13 can be switched between the locked state and the unlocked state by an operation to the unlocking member 14. When being in the locked state, the locking member 13 is limited inside the electrified guide rail 3 (reference may be made to the drawing number (C) in FIG. 1 for the locked state). In this way, the adapter will not fall off from the electrified guide rail 3, so that the adapter is locked inside the electrified guide rail. When the adapter needs to be plugged into and unplugged from the electrified guide rail 3, the unlocking member 14 is operated to switch the locking member 13 from the locked state to the unlocked state (reference may be made to the drawing number (B) in FIG. 1 for the unlocked state). In this way, the locking member 13 is released from the electrified guide rail 3 and can freely enter and exit the opening 301 of the electrified guide rail 3, so that the adapter can be plugged and unplugged smoothly.

The locking member 13 may be switched between the locked state and the unlocked state in a manner of rotation or linear movement, which are respectively described below by examples.

Figure 2:
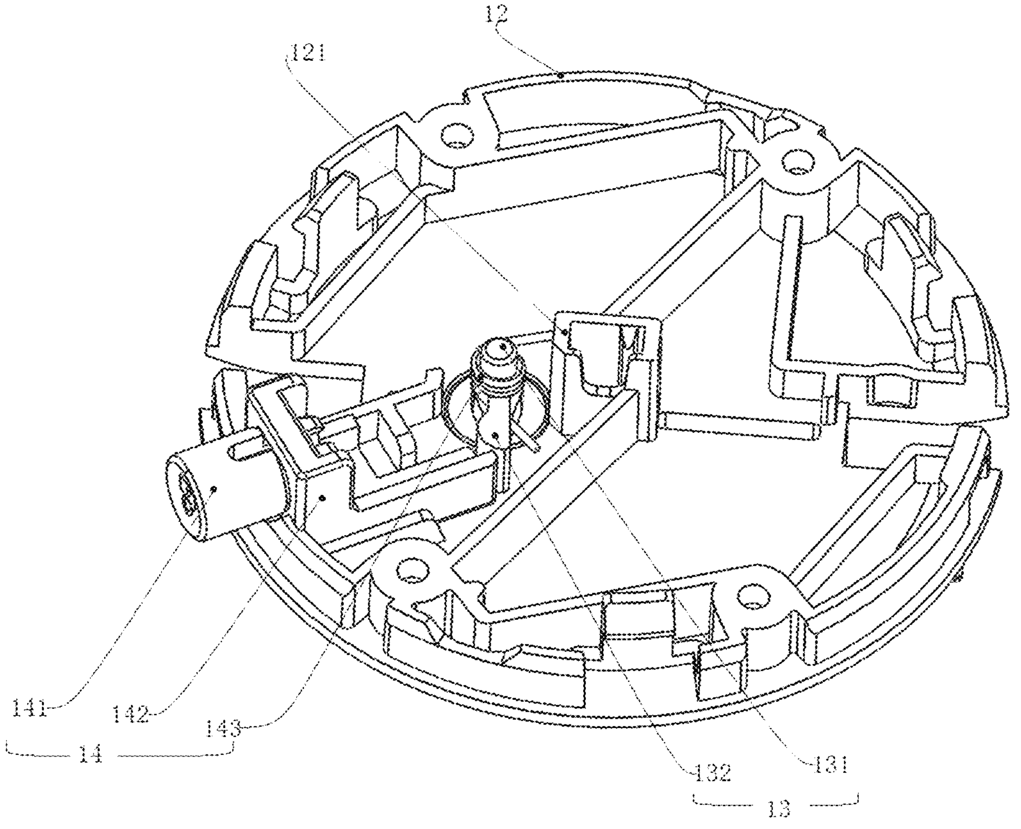
FIG. 2 is a partial top view of an exemplary adapter according to an embodiment of the disclosure.
Figure 3:
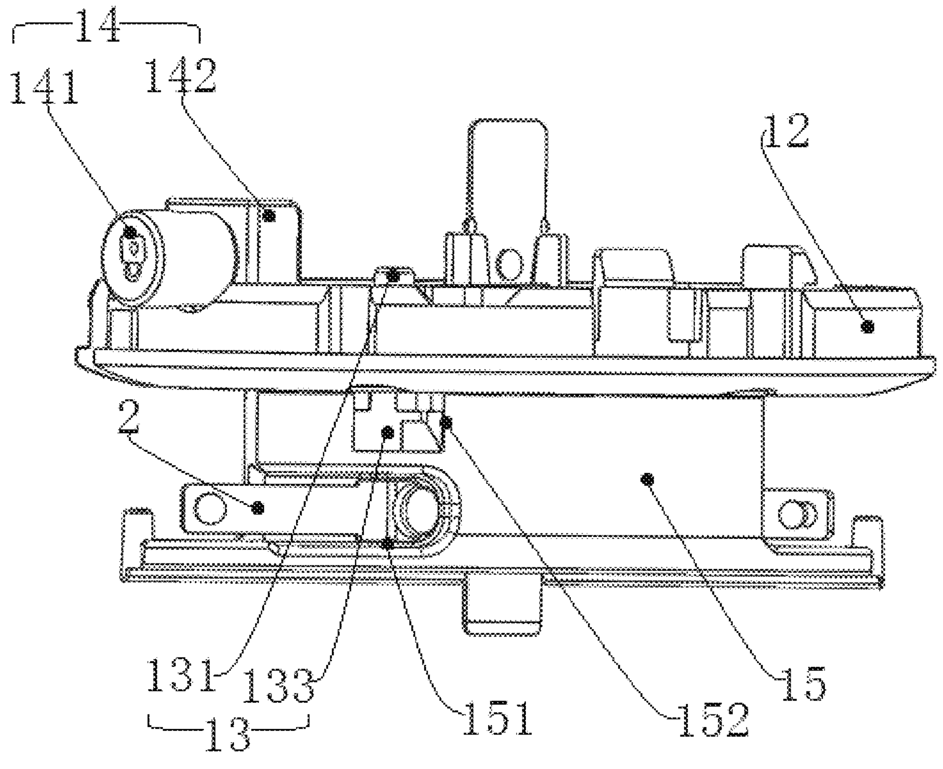
FIG. 3 is a partial side view of an exemplary adapter according to an embodiment of the disclosure.

(1) In some optional implementations, the embodiment of the present disclosure provides a locking member 13 that may be switched between a locked state and a unlocked state by rotating. As shown in FIG. 2 and FIG. 3, the locking member 13 includes a rotating portion 131, a connecting portion 132 and a first locking portion 133. The rotating portion 131 runs through the fixed support 12, and the rotating portion 131 may rotate. A first end of the connecting portion 132 is connected to a first end of the rotating portion 131 disposed above the fixed support 12, and a second end of the connecting portion 132 is connected to an unlocking member 14. The first locking portion 133 is connected to a second end of the rotating portion 131 disposed below the fixed support 12, and the first locking portion 133 is switched between the locked state and the unlocked state by rotating.

For example, the rotating portion 131 is a cylinder or a prism (the cylinder is more favorable for simplifying a preparing process). The fixed support 12 is provided with a via hole at a position corresponding to the locking member 13, and the rotating portion 131 passes through the via hole. Moreover, the rotating portion 131 has a first part disposed above the fixed support 12 (that is, a direction away from the electrified guide rail 3) and a second part disposed below the fixed support 12. The rotating portion 131 may rotate in the via hole. Exemplarily, the rotating portion 131 is in clearance fit with the via hole, and central axes of the rotating portion and the via hole coincide, which facilitates the stable rotation of the rotating portion 131 around the central axis thereof.

The connecting portion 132 and the unlocking member 14 are both disposed above the fixed support 12 to effectively utilize an internal space of the adapter. The first end of the connecting portion 132 is connected to the first end of the rotating portion 131 disposed above the fixed support 12. The second end of the connecting portion 132 is connected to the unlocking member 14. The first locking portion 133 is connected to the second end of the rotating portion 131 disposed below the fixed support 12. In this way, when the unlocking member 14 is operated to act on the connecting portion 132, the connecting portion 132 may transmit the action to the rotating portion 131 to enable the same to rotate. Then the rotating portion 131 that is rotated drives the first locking portion 133 to rotate, thereby causing the first locking portion 133 to be switched between the locked state and the unlocked state.

The structure of the connecting portion 132 is adaptively designed according to the structures of the unlocking member 14 and the rotating portion 131, as long as the above connection can be ensured. For example, the first end of the connecting portion 132 connected to the rotating portion 131 is a sleeve-like structure. In this way, the connection can be realized by sleeving the connecting portion 132 on an outside of the first end of the connecting portion 132. The second end of the connecting portion 132 connected to the unlocking member 14 may be in a shape of a circular arc block, a rectangular block, or an angular block. Besides, the connection mode between the second end of the connecting portion 132 and the unlocking member 14 includes a fixed connection or a non-fixed connection (for example, in contact only). For example, the connection mode between the connecting portion 132 and the unlocking member 14 is a contact connection, a clamping connection, a magnetic connection, etc.

Figure 4:
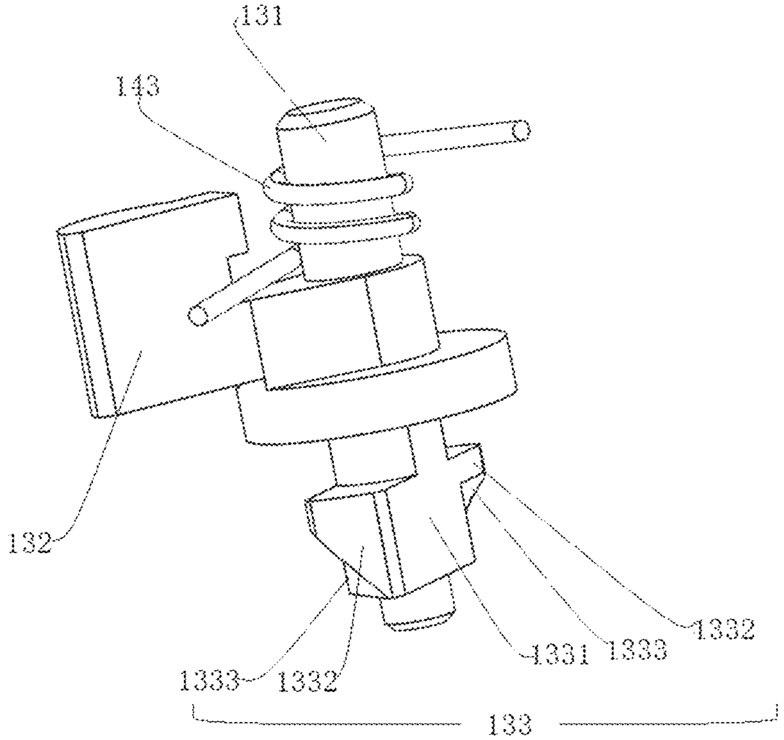
FIG. 4 is a schematic structural diagram of an exemplary first locking portion according to an embodiment of the disclosure.
Figure 5:
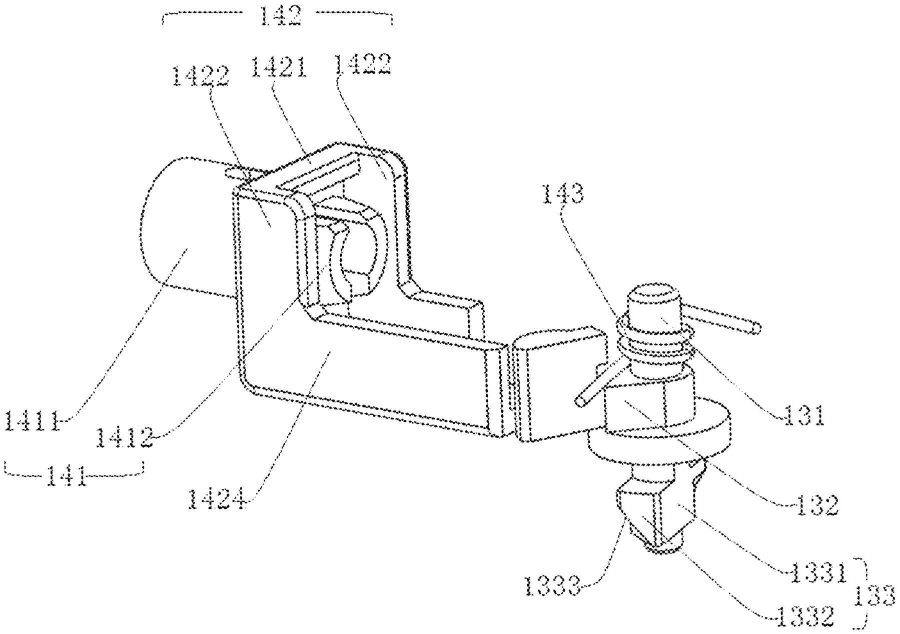
FIG. 5 is a schematic diagram of a connection relationship between an exemplary locking member and an exemplary unlocking member according to an embodiment of the present disclosure.

In some optional implementations, as shown in FIG. 4 or FIG. 5, the first locking portion 133 includes a locking portion body 1331 and a locking block 1332. The locking portion body 1331 is connected to the second end of the rotating portion 131. The locking block 1332 is connected to a side wall of the locking portion body 1331, and the locking block 1332 is stopped by an inner surface of a top wall of the electrified guide rail 3 disposed on both sides of the opening 301 in the locked state. In other words, the locking block 1332 and the inner surface of the top wall of the electrified guide rail 3 disposed at the side part of the opening 301 block each other to achieve the locking.

Further, as shown in FIG. 4, the first locking portion 133 includes two locking blocks 1332, and the two locking blocks 1332 are connected to opposite side walls of the locking portion body 1331, that is, the two locking blocks 1332 are respectively disposed on both sides of the locking portion body 1331. In this way, the two locking blocks 1332 and the inner surface of the top wall of the electrified guide rail 3 disposed on both sides of the opening 301 can block each other, which is beneficial to improve the limiting effect.

In the embodiment of the present disclosure, the connection mode between the locking portion body 1331 and the second end of the rotating portion 131 includes but not limited to: integrally formed connection, threaded connection, clamping connection, etc.

The locking block 1332 and the locking portion body 1331 are of the integrally formed connection to acquire a sufficient connection strength. The structure of the locking block 1332 includes but not limited to: a rectangular block shape, an arc block shape, an angular block shape, and some irregular blocks with irregular geometric shapes.

In some optional implementations, as shown in FIG. 4, an end part of the locking block 1332 away from the locking portion body 1331 has a guiding surface 1333. The guiding surface 1333 is configured to act on the inner wall of the opening 301 by contact when the first locking portion 133 enters the opening 301 of the electrified guide rail 3, so that the first locking portion 133 is rotated from the locked state to the unlocked state.

Figure 6:
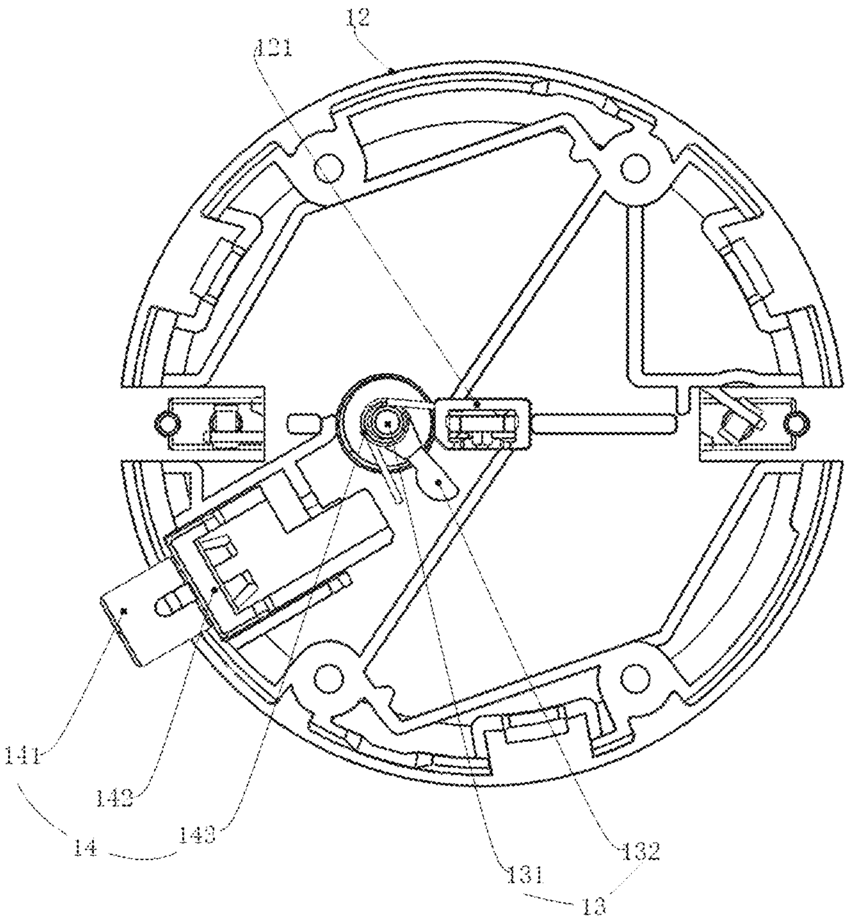
FIG. 6 is a schematic diagram of an automatic unlocking state of an exemplary locking member according to an embodiment of the present disclosure.

The guiding surface 1333 is opposite to the inner wall of the opening 301 of the electrified guide rail 3. Besides, the structure of the guiding surface 1333 meets the following requirements: once the locking block 1332 in the locked state is in contact with the inner wall of the opening 301 of the electrified guide rail 3, the inner wall of the opening 301 of the electrified guide rail 3 presses the locking block 1332 based on the contact action, so that the first locking portion 133 can rotate and smoothly enter the opening 301. In the process of entering the opening 301, the locking block 1332 is always pressed by the inner wall of the opening 301, so that the first locking portion 133 continues to rotate until the first locking portion 133 is rotated to the unlocked state (referring to the state shown in FIG. 6, at this time, the unlocking member 14 is not operated, and only the locking member 13 is automatically rotated to the unlocked state).

For example, the guiding surface 1333 is an inclined surface or an arc surface, and an inclination direction of the inclined surface or a radian direction of the arc surface is a rotation direction of the locking block 1332 to guide the locking block 1332 to rotate.

Figure 7:
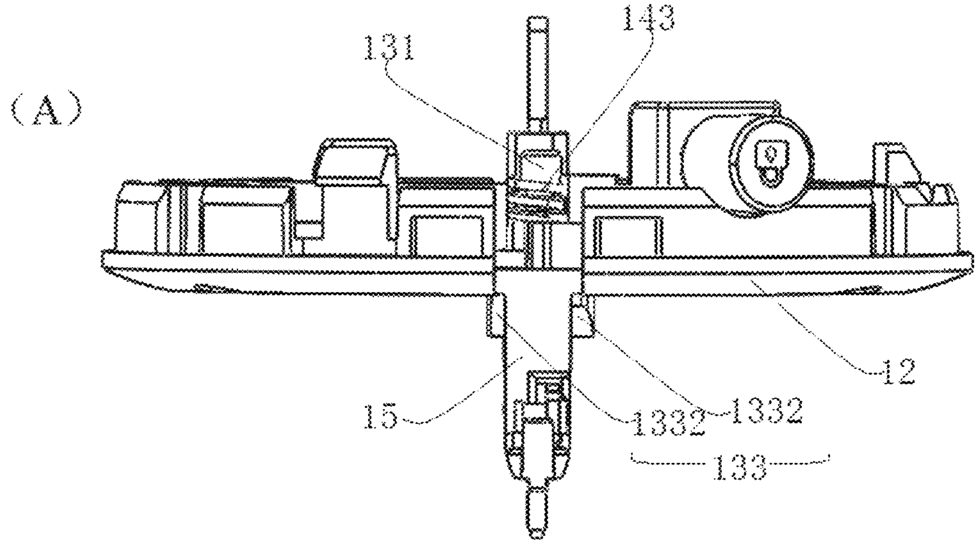
FIG. 7 is a schematic diagram of a process from a locked state to an unlocked state of an exemplary locking block according to an embodiment of the present disclosure.
Figure 7:
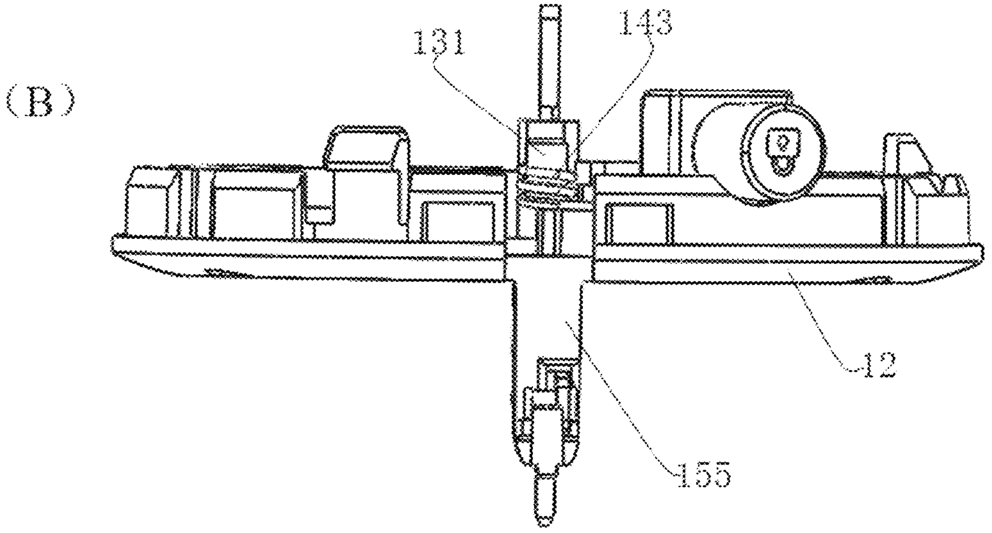

It can be seen that according to the embodiment of the present disclosure, the guiding surface 1333 is disposed at the end part of the locking block 1332. When the first locking portion 133 enters the opening 301 of the electrified guide rail 3, the guiding surface 1333 acts on the inner wall of the opening 301 by contact, so as to drive the first locking portion 133 to rotate. Therefore, the first locking portion 133 is automatically rotated from the locked state to the unlocked state (referring to the process shown in FIG. 7), which is beneficial to improve the user experience. In other words, when the adapter is plugged into the electrified guide rail 3, it is not necessary to operate the unlocking member 14. That is, without other additional actions, the first locking portion 133 can be automatically rotated to the unlocked state, so that the adapter can be plugged smoothly, and meanwhile, a better plugging hand feeling can be acquired.

For the above implementation (1), the unlocking member 14 is adaptively designed according to the structure of the locking member 13, as long as when the unlocking member 14 is operated, the locking member 13 can be driven to rotate. The structure of the unlocking member is 14 is described exemplarily hereinafter.

Figure 8:
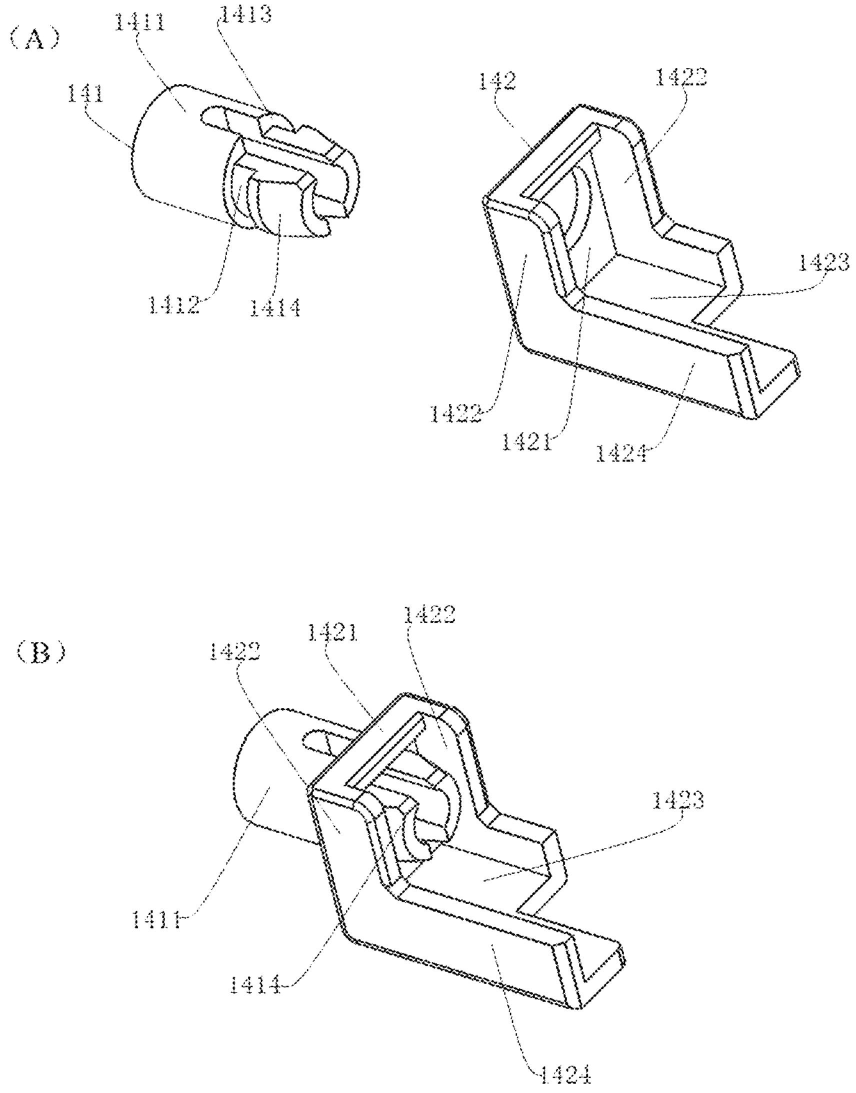
FIG. 8 is a schematic structural diagram of an exemplary unlocking member according to an embodiment of the present disclosure.

In some optional implementations, as shown in FIG. 8, the unlocking member 14 includes a first operating portion 141 and a first transmission portion 142. The first operating portion 141 is movably connected to the side wall of the fixed support 12. A first end of the first transmission portion 142 is connected to the first operating portion 141, and a second end of the first transmission portion 142 is connected to the connecting portion 132.

By an operation, for example, by pressing the first operating portion 141, the first transmission portion 142 transmits a force to the connecting portion 132 of the locking member 13, so as to drive the connecting portion 132 to rotate. The connecting portion 132 that is rotated simultaneously drives the first locking portion 133 to rotate, so that the first locking portion 133 is switched from the locked state to the unlocked state.

An operation mode of the first operating portion 141 includes but not limited to: a pressing mode, a toggle mode, etc., which are respectively described by examples below.

As an example, the first operating portion 141 is a button, which is operated by the pressing mode. The side wall of the fixed support 12 is provided with an opening or a slot for accommodating the first operating portion 141 of such a button structure. The first operating portion 141 may be movably disposed inside the opening or slot by pressing.

In the embodiment of the present disclosure, a corresponding opening is also disposed in the side wall of a housing of the adapter to accommodate the first operating portion 141 of the button structure, so that the first operating portion 141 can be pressed. The first operating portion 141 is disposed at a position where the thumb of a user is most suitable for pressing, so as to conform to ergonomics and unlock the adapter in the most comfortable state. Therefore, the unlocking process is simple and smooth.

A detachable connection mode is adopted between the first operating portion 141 and the first transmission portion 142 to facilitate assembly. For example, the detachable connection mode is a threaded connection, a clamping connection, and the like.

Taking the clamping connection as an example, as shown in FIG. 8, the first operating portion 141 includes a button section 1411 and a first connecting section 1412 which are sequentially connected. An outer diameter of the first connecting section 1412 is less than an outer diameter of the button section 1411 to form a limiting step 1413 at a connecting position between the first connecting section 1412 and the button section 1411. The first connecting section 1412 is of an elastic structure that extends and retracts in a radial direction. For example, the first connecting section 1412 is sleeve-shaped, and the side wall where the first connecting section 1412 is disposed is provided with a plurality of strip-shaped holes which extend axially and are arranged along the circumferential direction, so that the first connecting section 1412 of the first operating portion 141 extends and retracts in the radial direction. A clamping block 1414 is disposed on an outer side of the side wall of a free end of the first connecting section 1412 away from the button section 1411. Correspondingly, the part of the first transmission portion 142 connected to the first operating portion 141 has a clamping hole. During application, the first connecting section 1412 of the first operating portion 141 is plugged into the clamping hole. Under the press of the inner wall of the clamping hole or a manual press, the first connecting section 1412 is compressed in the radial direction, so that the first connecting section 1412 passes through the clamping hole until a wall of the first transmission portion 142 facing the limiting step 1413 is stopped by the limiting step 1413. Then, the first connecting section 1412 is no longer pressed, and the first connecting section 1412 is automatically reset based on the elasticity thereof. At this time, a wall of the first transmission portion 142 away from the limiting step 1413 is blocked by the clamping block 1414, so that the first transmission portion 142 is limited between the limiting step 1413 and the clamping block 1414. In this way, the first operating portion 141 and the first transmission portion 142 are connected in a clamping manner.

In order to improve the stability of the first transmission portion 142, the first transmission portion 142 may also be connected to the fixed support 12. For example, a plugging slot is disposed in the fixed support 12, and the first transmission portion 142 is plugged into the plugging slot.

Figure 9:
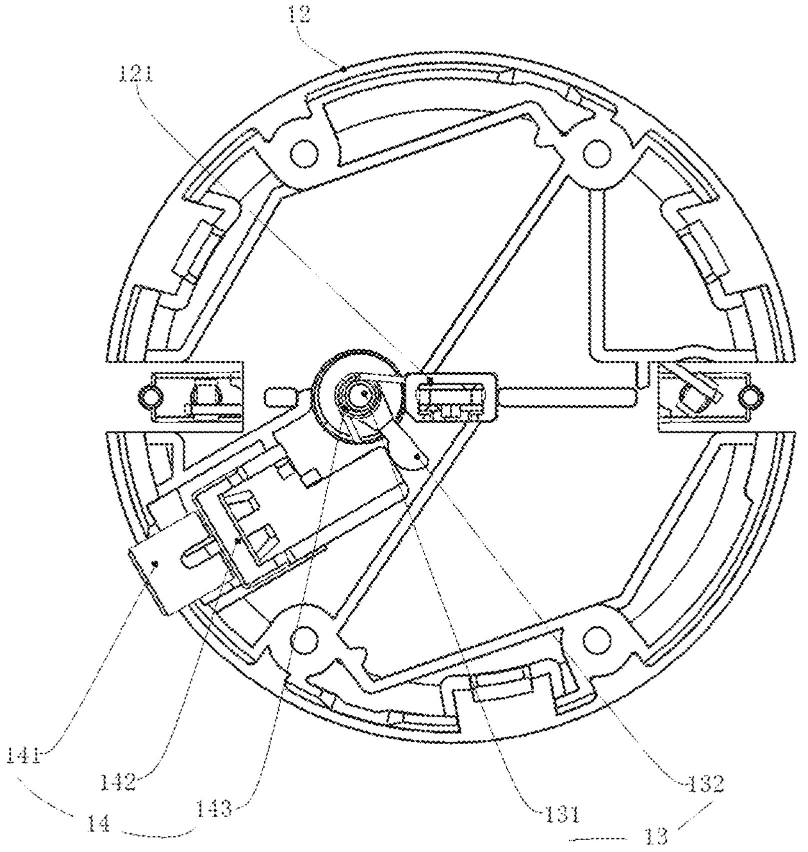
FIG. 9 is a schematic diagram showing that an exemplary locking member is driven to an unlocked state by an unlocking member according to an embodiment of the present disclosure.

When the first operating portion 141 is a button, and the first transmission portion 142 is configured that it may transmit a pressing action force of the button to the first locking portion 133 when the button is pressed, thereby causing the first locking portion 133 to rotate. FIG. 9 shows that by pressing the first operating portion 141, the first operating portion 141 pushes the locking member 13 to rotate, so that the locking member 13 is rotated from the locked state to the unlocked state.

For example, as shown in FIG. 8, the first transmission portion 142 includes a connecting plate 1421, two side reinforcing plates 1422, a bottom plate 1423 and a push plate 1424. The connecting plate 1421 is along a direction perpendicular to the first operating portion 141. The two side reinforcing plates 1422 are respectively connected to two opposite side ends of the connecting plate 1421 and extend in the direction away from the first operating portion 141. The bottom plate 1423 is perpendicularly connected to a bottom end of the connecting plate 1421 and extends along the direction away from the first operating portion 141. One end of the push plate 1424 is connected to the end part of the bottom plate 1423 away from the connecting plate 1421, and the other end of the push plate 1424 is connected to the second end of the connecting portion 132 (reference may be made to the description of the above connection mode between the connecting portion 132 and the unlocking member 14 for the specific connection mode).

Figure 10:
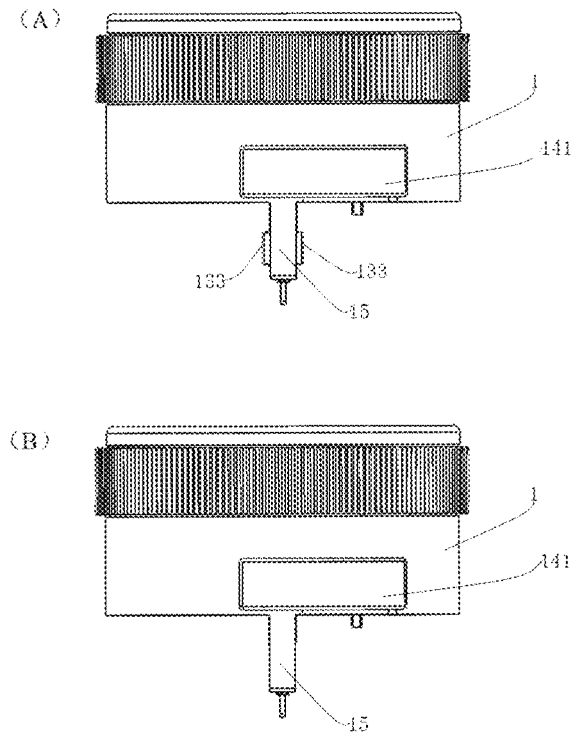
FIG. 10 is a schematic diagram of a process of an exemplary toggle-type adapter from a locked state to an unlocked state according to an embodiment of the present disclosure.
Figure 11:
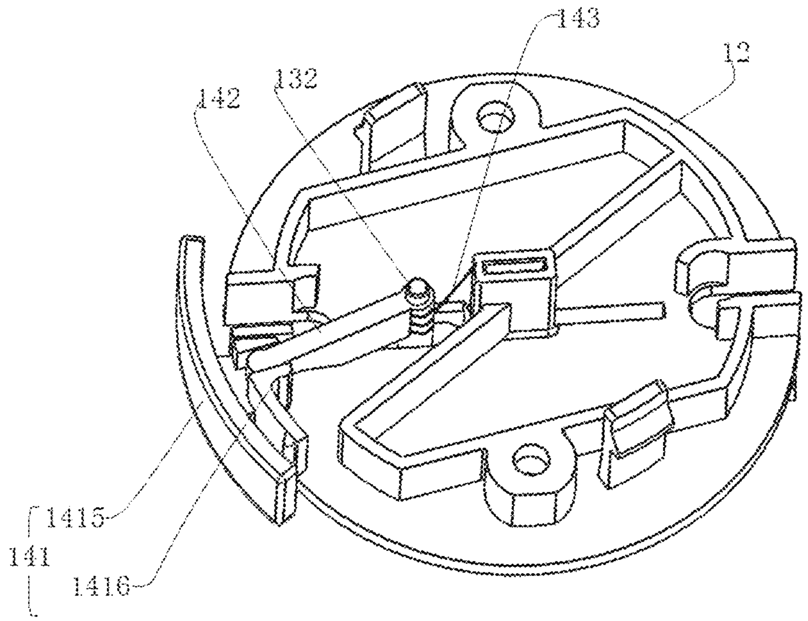
FIG. 11 is a structural diagram of a partial structure of an exemplary toggle-type adapter according to an embodiment of the present disclosure.

As another example, as shown in FIG. 10, the first operating portion 141 is a toggle sheet. For example, as shown in FIG. 11, the first operating portion 141 of the toggle sheet structure includes a toggle section 1415 and a second connecting section 1416. The toggle section 1415 is an arc-shaped sheet structure. A first end of the second connecting section 1416 is connected to an inner side wall of the toggle section 1415, and a second end of the second connecting section 1416 is connected to the first transmission portion 142.

In the embodiment of the present disclosure, a radian of the arc-shaped sheet toggle section 1415 is adapted to a radian of a circular side wall of the adapter, and the arc-shaped sheet toggle section is operated by toggling clockwise or counterclockwise in the circumferential direction. A corresponding arc-shaped strip hole is disposed in the side wall of the housing of the adapter to provide a movement space for toggling the first operating portion 141. The toggle section 1415 is attached to the side wall of the housing of the adapter.

The outer side wall of the arc-shaped sheet toggle section 1415 is provided with a rough structure, for example, geometric lines, to increase a frictional force with fingers, thereby enabling the toggle operation to be more laborsaving.

The second connecting section 1416 is block-shaped. For example, the first end of the second connecting section 1416 and the inner wall of the toggle section 1415 are connected in an integrated manner to improve the connection strength. The second end of the second connecting section 1416 is connected to the first transmission portion 142 in a clamping manner to facilitate assembly.

For example, a clamping slot is disposed in a top surface of the second connecting section 1416, and the first end of the first transmission portion 142 extends into the clamping slot to achieve a clamping connection with the second connecting section 1416. Further, an arc-shaped slot is disposed in the bottom surface of the second connecting section 1416, and the arc direction of the arc-shaped slot is the same as a toggle direction of the toggle section 1415. Correspondingly, an arc-shaped guiding block is disposed on the top of the fixed support and the arc-shaped guiding block is disposed in the arc-shaped slot. In this way, when the toggle section 1415 is toggled, the first operating portion 141 will stably move along a toggle trajectory.

When the first operating portion 141 is a toggle sheet, the first transmission portion 142 is configured that when the toggle sheet is toggled, the first transmission portion 142 can transmit a toggle action force of the toggle sheet to the first locking portion 133, and thus the first locking portion 133 is caused to rotate.

For example, the first transmission portion 142 is a rod-shaped structure, the first end of the first transmission portion 142 is connected to the second connecting section 1416 of the first operating portion 141 in a clamping manner, and the second end of the first transmission portion 142 is fixedly connected to the side wall of the connecting portion 132 of the locking member 13.

In some optional implementations, as shown in FIG. 2, the top of the fixed support 12 has a stop block 121. Meanwhile, the unlocking member 14 further includes an elastic portion 143. The elastic portion 143 is limited between the connecting portion 132 and the stop block 121. The elastic portion 143 is configured to keep the first locking portion 133 in the locked state. Besides, when an external force acts on the first operating portion 141, the elastic portion 143 is pressed to be deformed so as to cause the first locking portion 133 to rotate from the locked state to the unlocked state.

For example, the elastic portion 143 is a compression spring or a torsion spring. Taking the torsion spring as shown in FIG. 2 as an example for explanation, a spring body of the torsion spring sleeves on the rotating portion 131 of the locking member 13, one torsion arm of the torsion spring acts on the connecting portion 132 of the locking member 13 by contact, and the other torsion arm of the torsion spring acts on the stop block 121, so that the torsion spring is limited between the connecting portion 132 and the stop block 121. In this way, when the torsion spring is in an initial state, the elastic force thereof can keep the first locking portion 133 in the locked state. When the external force acts on the first operating portion 141 to rotate the connecting portion 132, the connecting portion 132 presses the torsion arm in contact therewith to deform the torsion arm. A elastic force generated by the deformation may cause the first locking portion 133 to automatically rotate from the locked state to the unlocked state.

Taking the compression spring as an example (not shown in the drawing) for explanation, one end of the compression spring is connected to the connecting portion 132, and the other end of the compression spring is connected to the stop block 121. In this way, when the compression spring is in the initial state, the elastic force thereof can keep the first locking portion 133 in the locked state. When the external force acts on the first operating portion 141 to rotate the connecting portion 132, the compression spring is pressed to be deformed by the connecting portion 132. The elastic force generated by the deformation may cause the first locking portion 133 to be automatically rotated from the locked state to the unlocked state.

It can be seen that according to the embodiment of the present disclosure, the elastic portion 143 is disposed for operation. For example, when the first operating portion 141 is pressed, the first transmission portion 142 transmits a pressing force to the connecting portion 132 of the locking member 13, so as to drive the connecting portion 132 to rotate. The connecting portion 132 that is rotated presses the elastic portion 143, and drives the first locking portion 133 to rotate simultaneously, so that the first locking portion 133 is switched from the locked state to the unlocked state. When the first operating portion 141 is no longer pressed, the pressed elastic portion 143 is automatically reset, and further drives the rotating portion 131 to reset, so that the first locking portion 133 is automatically reset from the unlocked state to the locked state.

Specifically, when the first locking portion 133 is plugged into an accommodating cavity 302 of the electrified guide rail 3 through the opening 301 of the electrified guide rail 3, and after the first locking portion 133 is unplugged from the accommodating cavity 302 of the electrified guide rail 3 from the opening 301 of the electrified guide rail 3, the first locking portion 133 can be automatically reset from the unlocked state to the locked state based on the elastic portion 143.

When the unlocking member 14 includes the elastic portion 143, based on the fact that the locking member 13 can be automatically reset, the connection mode between the connecting portion 132 of the locking member 13 and the unlocking member 14 may be the contact connection. In this way, after the first locking portion 133 is pressed by the inner wall of the opening 301 of the electrified guide rail 3 to automatically rotate to the unlocked state, the first locking portion 133 can be automatically reset from the unlocked state to the locked state based on the existence of the elastic portion 143. There is no need to rely on operating the first operating portion 141 to reset the first locking portion 133 to be the locked state.

Figure 12:
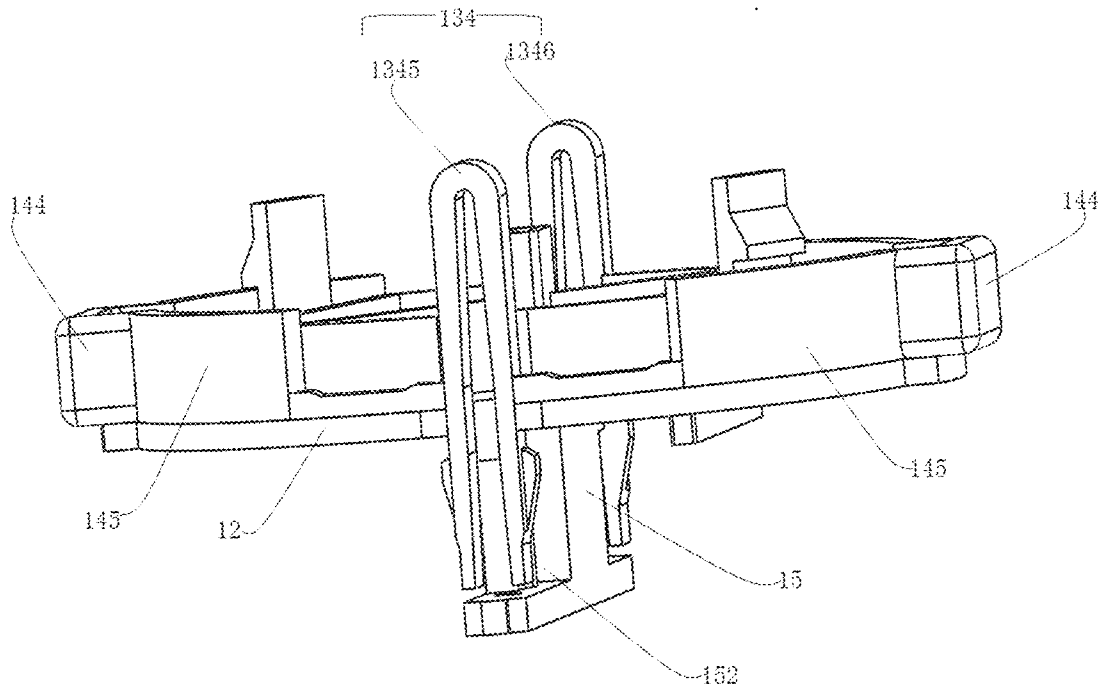
FIG. 12 is a schematic diagram of a first partial structure of another exemplary adapter according to an embodiment of the present disclosure.
Figure 13:
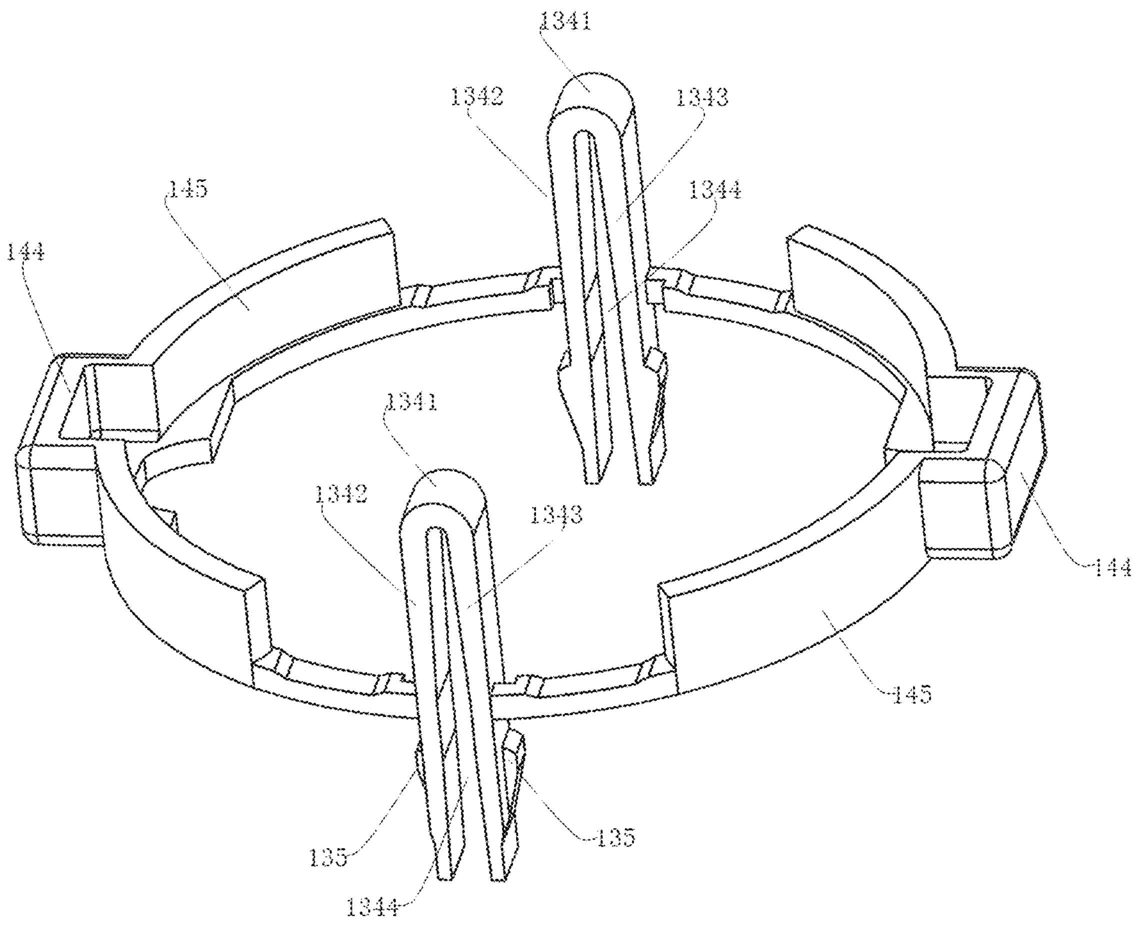
FIG. 13 is a schematic diagram of a second partial structure of another exemplary adapter according to an embodiment of the present disclosure.

(2) In some optional implementations, the embodiment of the present disclosure provides a locking member 13 that can be switched between the locked state and the unlocked state in a manner of extending and retracting movement. As shown in FIG. 12 and FIG. 13, the locking member 13 includes a deforming portion 134 and a second locking portion 135. The deforming portion 134 runs through the fixed support 12. The second locking portion 135 is connected to one end of the deforming portion 134 disposed below the fixed support 12. The deforming portion 134 may be elastically deformed under action of the unlocking member 14, so that the second locking portion 135 can be switched between the locked state and the unlocked state through the extending and retracting movement.

The deforming portion 134 may be elastically deformed under the action of the unlocking member 14, so as to drive the second locking portion 135 to extend and retract (when extending, the second locking portion 135 is in the locked state; and when being compressed, the second locking portion 135 is in the unlocked state). Therefore, the purpose of switching the second locking portion 135 between the locked state and the unlocked state is achieved.

Regarding the structure of the deforming portion 134, in an optional implementation, as shown in FIG. 13, the deforming portion 134 includes a top plate 1341, a first side plate 1342, and a second side plate 1343. The first side plate 1342 and the second side plate 1343 are respectively connected to two opposite ends of the top plate 1341, and there is a gap 1344 between the first side plate 1342 and the second side plate 1343. The second locking portion 135 is connected to a first surface of the first side plate 1342 and is connected to a second surface of the second side plate 1343. The first surface is a surface of the first side plate 1342 which is away from the gap 1344, and the second surface is a surface of the second side plate 1343 which is away from the gap 1344.

The top plate 1341 may have an arc plate shape or a flat plate shape. In particular, the arc plate shape is selected to enable the deforming portion 134 to be more conducive for elastic deformation. The first side plate 1342 and the second side plate 1343 are elongated rectangular plates to simplify the structure. Based on the existence of the top plate 1341, there is a gap 1344 between the first side plate 1342 and the second side plate 1343 to endow the deforming portion 134 with elasticity.

In the extending state (that is, the initial state), due to the existence of the gap 1344, the two second locking portions 135 are in the locked state. In a compressed state, the length of the gap 1344 is reduced, so that the two second locking portions 135 are also compressed correspondingly, and then switched to the unlocked state.

In another optional implementation, the deforming portion 134 includes two supporting side plates having opposite gaps, and an elastic member, for example, a compression spring, disposed between the two supporting side plates. A second locking portion 135 is connected to a surface of each supporting side plate away from the gap (the relevant drawing is not shown).

For such implementation, the elastic member is connected between the two supporting side plates to endow the deforming portion 134 with the elasticity.

In the embodiment of the present disclosure, the structure of the second locking portion 135 may be referred to the above description of the first locking portion 133, which will not be repeated here.

In some optional implementations, as shown in FIG. 13, the unlocking member 14 includes a second operating portion 144 and a second transmission portion 145. The second transmission portion 145 is arc-shaped, and the second transmission portion 145 is disposed on the top of the fixed support 2 (referring to FIG. 12). The second operating portion 144 is connected to the outside of the second transmission portion 145.

There are two unlocking members 14, and the deforming portion 134 includes a first deforming portion 1345 and a second deforming portion 1346. Two ends of the second transmission portion 145 of one unlocking member 14 are respectively connected to a first surface of the first deforming portion 1345 and a first surface of the second deforming portion 1346. Two ends of the second transmission portion 145 of the other unlocking member 14 are respectively connected to a second surface of the first deforming portion 1345 and a second surface of the second deforming portion 1346.

The structures of the first deforming portion 1345 and the second deforming portion 1346 may be referred to the above description of the structure of the deforming portion 134. That is, each of the first deforming portion 1345 and the second deforming portion 1346 includes the top plate 1341, the first side plate 1342, and the second side plate 1343. The first side plate 1342 and the second side plate 1343 are respectively connected to two opposite ends of the top plate 1341, and there is a gap 1344 between the first side plate 1342 and the second side plate 1343.

Two ends of the second transmission portion 145 of one unlocking member 14 are respectively connected to the first surfaces of the first side plates 1342 of the first deforming portion 1345 and the second deforming portion 1346. Two ends of the second transmission portion 145 of the other unlocking member 14 are respectively connected to the second surfaces of the second side plates 1343 of the first deforming portion 1345 and the second deforming portion 1346.

Figure 14:
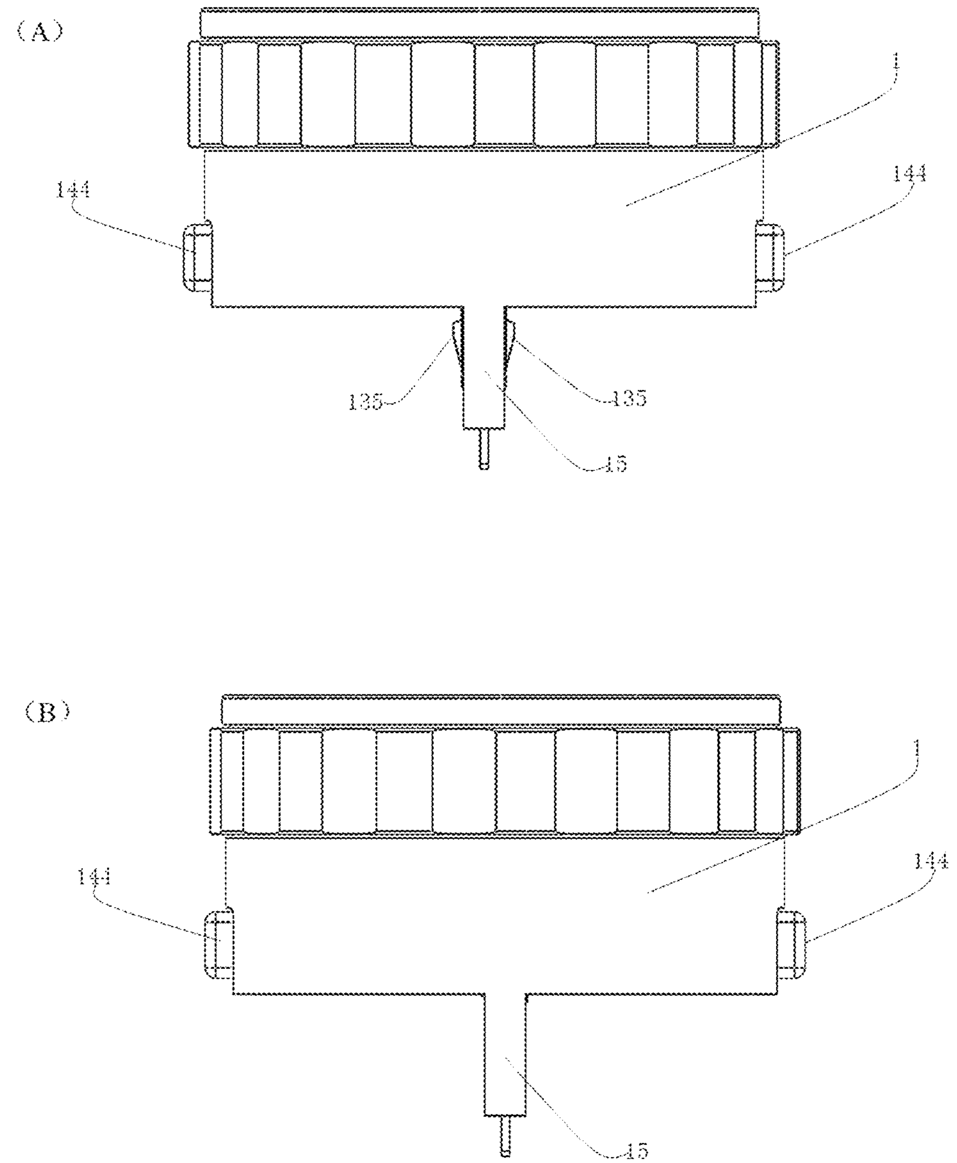
FIG. 14 is a schematic diagram of a process of an exemplary adapter acquired based on the structure shown in FIG. 12 from a locked state to an unlocked state according to an embodiment of the present disclosure.

During application, the two second operating portions 144 are simultaneously pressed to reduce an interval between the two second transmission portions 145. The second transmission portions 145 transmit the pressing force to the first deforming portion 1345 and the second deforming portion 1346 of the unlocking member 14, so that the length of the gap 1344 of both the first deforming portion 1345 and the second deforming portion 1346 is reduced. Therefore, the two second locking portions 135 connected to the first deforming portion 1345 and the two second locking portions 135 connected to the second deforming portion 1346 are all compressed correspondingly, and then are switched to the unlocked state (referring to the unlocking process shown in FIG. 14). When the second operating portion 144 is no longer pressed, the deforming portion 134 is automatically reset based on the elasticity thereof and restores the locked state.

In some optional implementations, as shown in FIG. 3, the adapter according to the embodiment of the present disclosure further includes a guiding block 15. The guiding block 15 is connected to a bottom of the fixed support 12, and may move along a length direction of the electrified guide rail 3.

The shape and structure of the guiding block 15 should ensure that the guiding block can be plugged into the accommodating cavity 302 through the opening 301 in the electrified guide rail 3.

The wall of the guiding block 15 has a first accommodating space 151 and a second accommodating space 152. The first accommodating space 151 is configured to accommodate the power-taking portion 2. The second accommodating space 152 is configured to accommodate the first locking portion 133 or the second locking portion 135.

The power-taking portion 2 is accommodated in the first accommodating space 151 when in an assemble state and plays a protective role, and is smoothly plugged into the accommodating cavity 302 through the opening 301 in the electrified guide rail 3. When the power-taking portion 2 is rotated, the guiding block 15 is connected to the bottom of the fixed support 12, so that the guiding block 15 can always stay in the original position, and only the power-taking portion 2 is out the first accommodating space 151 by rotating.

The first locking portion 133 or the second locking portion 135 is accommodated in the second accommodating space 152. The second accommodating space 152 should not affect the rotation or extending or retracting movement of the first locking portion 133 or the second locking portion 135.

Further, in the unlocked state, the first locking portion 133 or the second locking portion 135 is hidden in the second accommodating space 152.

The second accommodating space 152 is configured that: when the first locking portion 133 or the second locking portion 135 is in the locked state, the second accommodating space 152 only accommodates the locking portion body of the first locking portion 133 or the second locking portion 135; when the first locking portion 133 or the second locking portion 135 is in the unlocked state, the second accommodating space 152 accommodates the first locking portion 133 or the second locking portion 135 as a whole (that is, not only are the locking portion bodies of the first locking portion and the second locking portion accommodated in the second accommodating space 152, but also the locking blocks of the first locking portion and the second locking portion are accommodated in the second accommodating space 152). It can be seen that the second accommodating space 152 is configured to provide an accommodating space for the first locking portion 133 or the second locking portion 135 in the unlocked state, so as to hide the first locking portion 133 or the second locking portion 135 in the unlocked state.

According to the above structure of the adapter, the first locking portion 133 is taken as an example to illustrate some plugging or unplugging operation processes of the adapter.

In some optional implementations, referring to the drawing number (A) in FIG. 1, before the adapter is plugged into the electrified guide rail 3, the locking member 13 is in the unlocked state.

Referring to the drawing number (B) in FIG. 1, when the adapter is plugged into the electrified guide rail 3, that is, when the first locking portion 133 enters the opening 301 of the electrified guide rail 3 from the outside, the guiding surface 1333 acts on the inner wall of the opening 301 by contact, so as to drive the first locking portion 133 to rotate. When the first locking portion 133 is rotated to a certain angle, for example 90°, the first locking portion 133 is completely hidden in the second accommodating space 152. At this time, there is no obstruction between the opening 301 of the electrified guide rail 3 and the power-taking portion 2, and the adapter can be smoothly plugged into the accommodating cavity 302 of the electrified guide rail 3.

Referring to the drawing number (C) in FIG. 1, when the adapter is completely plugged into the accommodating cavity 302 of the electrified guide rail 3, there is no interaction force between the opening 301 of the electrified guide rail 3 and the first locking portion 133. The first locking portion 133 is restored to the initial locked state under the action of the elastic portion 143. At this time, the locking block 1332 of the first locking portion 133 and the opening 301 of the electrified guide rail 3 are misaligned. Under the action of a general external force, the adapter cannot fall off from the electrified guide rail.

In some optional implementations, when the adapter is unplugged from the inside of the electrified guide rail 3, that is, when the first locking portion 133 enters the opening 301 of the electrified guide rail 3 from the accommodating cavity 302, the first operating portion131 is operated, for example, is pressed, to finally drive the first locking portion 133 to rotate. When the first locking portion 133 is rotated to a certain angle, for example 90°, the first locking portion 133 is completely hidden in the second accommodating space 152. At this time, there is no obstruction between the opening 301 of the electrified guide rail 3 and the power-taking portion 2, and the adapter can be smoothly unplugged from the opening 301 of the electrified guide rail 3 (the state may also be referred to the drawing number (A) in FIG. 1).

In another aspect, the embodiment of the present disclosure also provides a rail socket. As shown in FIG. 1, the rail socket includes an electrified guide rail 3 and any one of the above dapters. The top and the inside of the electrified guide rail 3 respectively have an opening 301 and an accommodating cavity 302 which extend along the length direction of the electrified guide rail 3. The power-taking portion 2 of the adapter may be assembled into the accommodating cavity 302 through the opening 301, and may rotate in the accommodating cavity 302 to a power-taking position for taking power.

The rail socket according to the embodiment of the present disclosure is based on the use of any one of the above adapters. When the electrified guide rail 3 is in a non-power-taking state, for example, in the assembly position, the adapter will not be separated from the electrified guide rail 3. In this way, it is not only conducive to protect the electrified guide rail 3, but also conducive to the efficient and stable operation of the adapter on the electrified guide rail 3 and the improvement of the user experience.

The rail socket according to the embodiment of the present disclosure includes but not limited to: a power socket and a universal serial bus (USB) socket, that is, the socket portion 1 is correspondingly designed as a power adapter or a USB adapter.

In some optional implementations, as shown in FIG. 1, a soft protective strip 303, for example, made of silica gel, is disposed on both sides of the top wall of the opening 301, and the soft protective strip 303 extends along the length direction of the opening 301. The soft protective strip 303 is configured to prevent impurities and the like from falling into the accommodating cavity, and can protect the components inside the accommodating cavity 302. Meanwhile, the protective strip is soft and thus does not affect the plugging and unplugging of the adapter.

In the case of improper use of the user or a severe external force, the adapter may be forced to drop from the electrified guide rail. However, due to the existence of the soft protective strip 303, the adapter would not be broken in the process of being forced to drop and a protective effect to the adapter would be played, and the locking member would not be broken at the same time.

In some optional implementations, the power-taking portion 2 includes a first electrical contact structure 21 (for example, an N-pole electrical contact structure), a first electrical contact structure 22 (for example, an L-pole electrical contact structure), and a third electrical contact structure 23 (for example, an E-pole electrical contact structure). When the power-taking portion 2 is rotated to the power-taking position, these electrical contact structures are respectively in contact with the conductive structures disposed inside the accommodating cavity 302 of the electrified guide rail 3.

Figure 15:
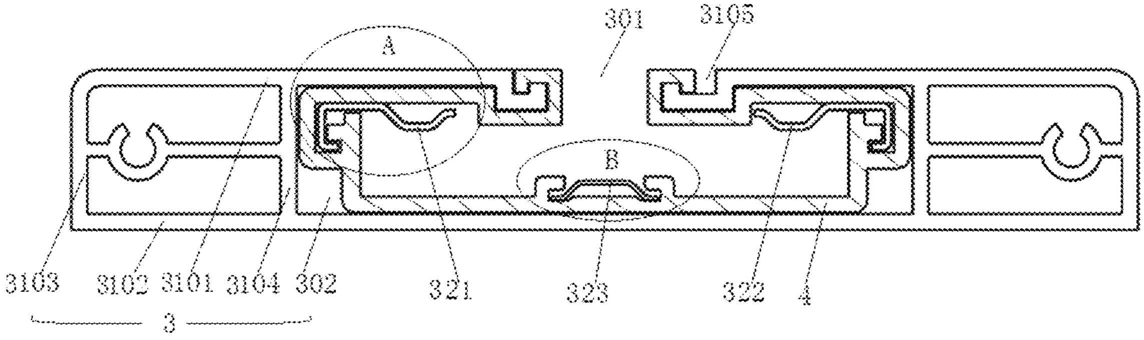
FIG. 15 is a cross-sectional view of an exemplary electrified guide rail according to an embodiment of the disclosure.
Figure 16:
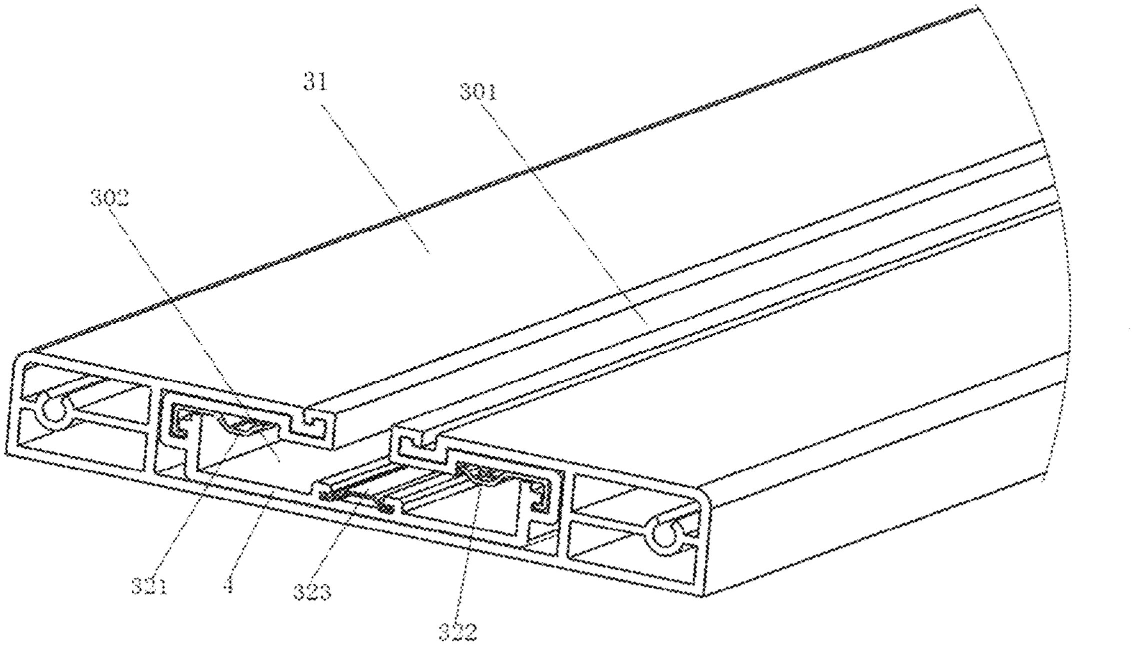
FIG. 16 is a partial isometric view of an exemplary electrified guide rail according to an embodiment of the disclosure.

As shown in FIG. 15 or FIG. 16, the electrified guide rail according to the embodiment of the present disclosure includes a guide rail body 31, a first conductive sheet 321, a second conductive sheet 322, and a third conductive sheet 323.

An inside of the guide rail body 31 has an accommodating cavity 302 extending along the length direction of the guide rail body 31, and the top of the guide rail body 31 has an opening 301 extending along the length direction of the guide rail body 31. The opening 301 is communicated with the accommodating cavity 302.

The first conductive sheet 321 and the second conductive sheet 322 are respectively disposed at the inner side of the top wall of the accommodating cavity 302 on both sides of the opening 301, and the first conductive sheet 321 and the second conductive sheet 322 both extend along the length direction of the guide rail body 31. The bottoms of the first conductive sheet 321 and the second conductive sheet 322 are configured for electrical contact. The third conductive sheet 323 is disposed at the inner side of the bottom wall of the accommodating cavity 302 and extends along the length direction of the guide rail body 31. A top of the third conductive sheet 323 is configured for electrical contact.

One of the first conductive sheet 321 and the second conductive sheet 322 is an L-pole conductive sheet while the other is an N-pole conductive sheet. The third conductive sheet 323 is an E-pole conductive sheet.

A plug (not shown) is led out from the exterior, for example, from the bottom of the electrified guide rail 3. The plug has an N-pole lead, an L-pole lead, and an E-pole lead therein. Exemplarily, the L-pole lead and the N-pole lead are electrically connected to the first conductive sheet 321 and the second conductive sheet 322 respectively, and the E-pole lead is electrically connected to the third conductive sheet 323, so that a conductive path is formed among the plug and the respective conductive sheets. During application, the plug of the electrified guide rail 3 is plugged into a fixed socket fixed on a fixed object such as a wall or a desktop, and the fixed socket is configured to supply power to the electrified guide rail.

In the electrified guide rail according to the embodiment of the present disclosure, the first conductive sheet 321, the second conductive sheet 322 and the third conductive sheet 323 are respectively disposed in the accommodating cavity 302 of the guide rail body 31 along the length direction. Each of the above conductive sheets has a sheet structure and has a smaller size, so that the size of the accommodating cavity 302 is correspondingly reduced, thereby effectively reducing the thickness of the electrified guide rail 1. The first conductive sheet 321 and the second conductive sheet 322 are both disposed on the top wall of the accommodating cavity 302, and only the bottoms of the first conductive sheet 321 and the second conductive sheet 322 are configured for electrical contact. In this way, an electrical contact area between the first conductive sheet 321 and an electrical connector, and an electrical contact area between the second conductive sheet 322 and the electrical connector can be reduced, so that a frictional area is further reduced, which is conductive to reduce the wear.

The structural arrangements of respective components in the electrified guide rail 1 involved in the embodiment of the present disclosure are described respectively below.

For the Guide Rail Body 31

In some optional implementations, as shown in FIG. 15, the guide rail body 31 includes a top plate 3101, a bottom plate 3102 and two first side plates 3103. An upper end of one first side plate 3103 is connected to an upper end of one side of the top plate 3101, and a lower end of the first side plate 3103 is connected to a lower end of one side of the bottom plate 3102. The side of the top plate 3101 and the side of the bottom plate 3102 extend in the length direction. An upper end of the other first side plate 3103 is connected to an upper end of the other side of the top plate 3101, and a lower end of the other first side plate 3103 is connected to a lower end of the other side of the bottom plate 3102. The other side of the top plate 3101 and the other side of the bottom plate 3102 extend in the length direction. The two first side plates 3103, the top plate 3101 and the bottom plate 3102 which have the above connection relationship cooperate to form the accommodating cavity 302.

On the top plate 3101, for example, the middle of the top plate 3101 is provided with an opening 301 along the length direction of the top plate 3101. The opening 301 is communicated with the accommodating cavity 302. The opening 301 is configured for plugging the power-taking portion of a power supply connector, so that the power-taking portion of the power supply connector smoothly enters the accommodating cavity 302 to take power.

In some optional implementations, as shown in FIG. 15, two second side plates 3104 are symmetrically disposed in the accommodating cavity 302 along the length direction. The two second side plates 3104 are respectively disposed at two sides of the opening 301. The upper end and the lower end of the second side plate 3104 are respectively connected, for example, perpendicularly connected to the top plate 3101 and the bottom plate 3102 at corresponding positions.

The accommodating cavity 302 is divided into three parts by the two second side plates 3104, that is, a middle cavity and side part cavities disposed on two sides of the middle cavity respectively. The above first conductive sheet 321, second conductive sheet 322 and third conductive sheet 323 are disposed in the middle cavity. In this way, the power-taking portion of the electrical connector is plugged into the middle cavity through the opening 301 to be in electrical contact with the above conductive sheets.

A reinforcing structure is disposed in the side part cavity. For example, the reinforcing structure may be a reinforcing plate (not marked in the drawing) parallel to the top plate 3101 and the bottom plate 3102, and the two ends of the reinforcing plate are respectively connected to the first side plate 3103 and the second side plate 3104, so that the structural stability of the guide rail body 31 can be significantly improved.

In some optional implementations, the guide rail body 31 further includes two cover plates (not marked in the drawing). The two cover plates are respectively disposed at the two ends of the top plate 3101 and the bottom plate 3102 perpendicular to the length direction. Each cover plate is connected to the end parts of the top plate 3101, the bottom plate 3102 and the two side plates 3103 simultaneously. The cover plates are configured to block the two ports of the accommodating cavity 302 to protect respective components inside the accommodating cavity 302.

The connection mode between the cover plate and the end parts of the top plate 3101, the bottom plate 3102 and the two side plates 3103 is a detachable connection. For example, a screw via hole is disposed in the cover plate, and a screw mounting sleeve (not marked in the drawing) is disposed at the position of the reinforcing plate corresponding to the screw via hole. A screw passes through the screw via hole in the cover plate and is connected to the screw mounting sleeve by threads, thereby achieving the above detachable connection.

For the First Conductive Sheet 321 and the Second Conductive Sheet 322

One of the first conductive sheet 321 and the second conductive sheet 322 is an L-pole (live wire) conductive sheet while the other is an N-pole (zero wire) conductive sheet, and the first conductive sheet and the second conductive sheet are symmetrically disposed on the inner side of the top wall of the accommodating cavity 302 at both sides of the opening 301. In some optional implementations, the structures of the first conductive sheet 321 and the second conductive sheet 322 are the same, so as to simplify the structure of the electrified guide rail.

Figure 17:
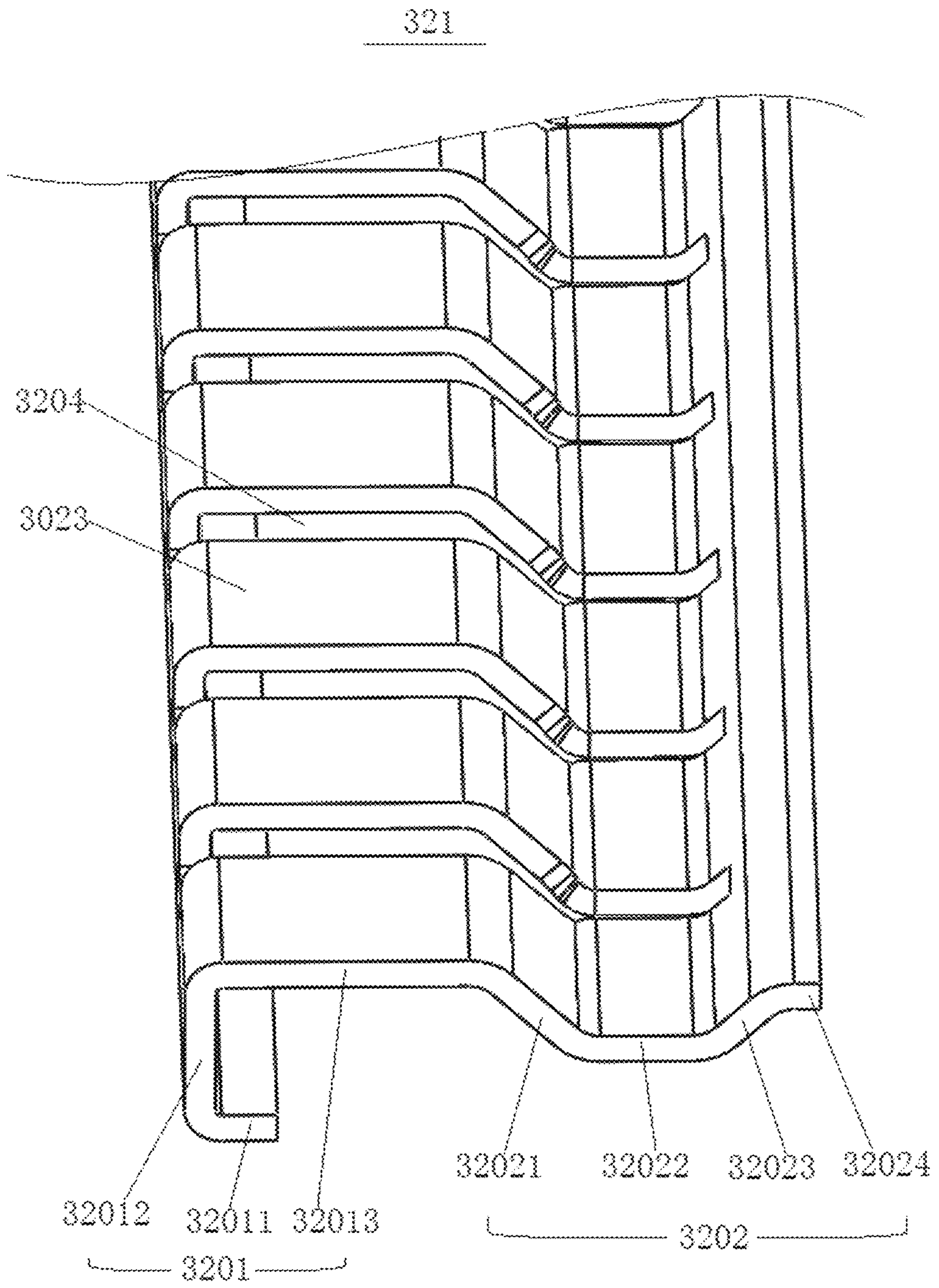
FIG. 17 is a schematic structural diagram of an exemplary first conductive sheet according to an embodiment of the disclosure.

Regarding the structural arrangement of the first conductive sheet 321 and the second conductive sheet 322 in the length direction, as an example, as shown in FIG. 17, each of the first conductive sheet 321 and the second conductive sheet 322 includes a plurality of conductive segments 3203 and a plurality of gaps 3204, which are distributed in the length direction. Each gap 3204 is disposed between two adjacent conductive segments 3203.

Taking the first conductive sheet 321 as an example, referring to FIG. 17, the plurality of conductive segments 3203 are sequentially distributed along the length direction of the first conductive sheet 321 at intervals, and the bottom of each conductive segment 3203 is configured for electrical contact. Each gap 3204 extends along a width direction of the first conductive sheet 321 and does not run through the two end parts of the first conductive sheet 321 in the width direction. In this way, the first conductive sheet 321 still maintains an integral structure.

Due to the existence of the gaps 3204, the plurality of conductive segments 3203 are prevented from being affected by each other. For example, when the power-taking portions of multiple electrical connectors are simultaneously plugged into the accommodating cavity 302 of the electrified guide rail 1, the power-taking portions of the multiple electrical connectors are in electrical contact with the conductive segments 3203 at the corresponding positions respectively. In this way, the power-taking portion of one certain electrical connector will only support upward the conductive segment 3203 in contact therewith, and only enable such conductive segment 3203 to have an upward movement tendency, without enabling other conductive segments 3203 adjacent to such conductive segment 3203 to acquire the upward movement tendency. That is, these other conductive segments 3203 are remained in the original positions. In this way, more reliable electrical contact can be achieved between the power-taking portions of the multiple electrical connectors and the conductive segments 3203 at the corresponding positions.

In addition, the existence of the gaps 3204 is also conducive to reduce the weight of the first conductive sheet 321 and the second conductive sheet 322, which is beneficial to save the cost of raw materials.

In the embodiment of the present disclosure, the width of the plurality of gaps 3204 is the same. For example, the width of the gaps 3204 ranges from 1 mm to 4 mm, for example, 1 mm, 2 mm, 3 mm, 4 mm, etc. Due to the gaps 3204 of the above width, not only is the effective mechanical isolation between the respective conductive segments 3203 realized, but also the erosion and forming on the above respective conductive sheets are facilitated.

Figure 18:
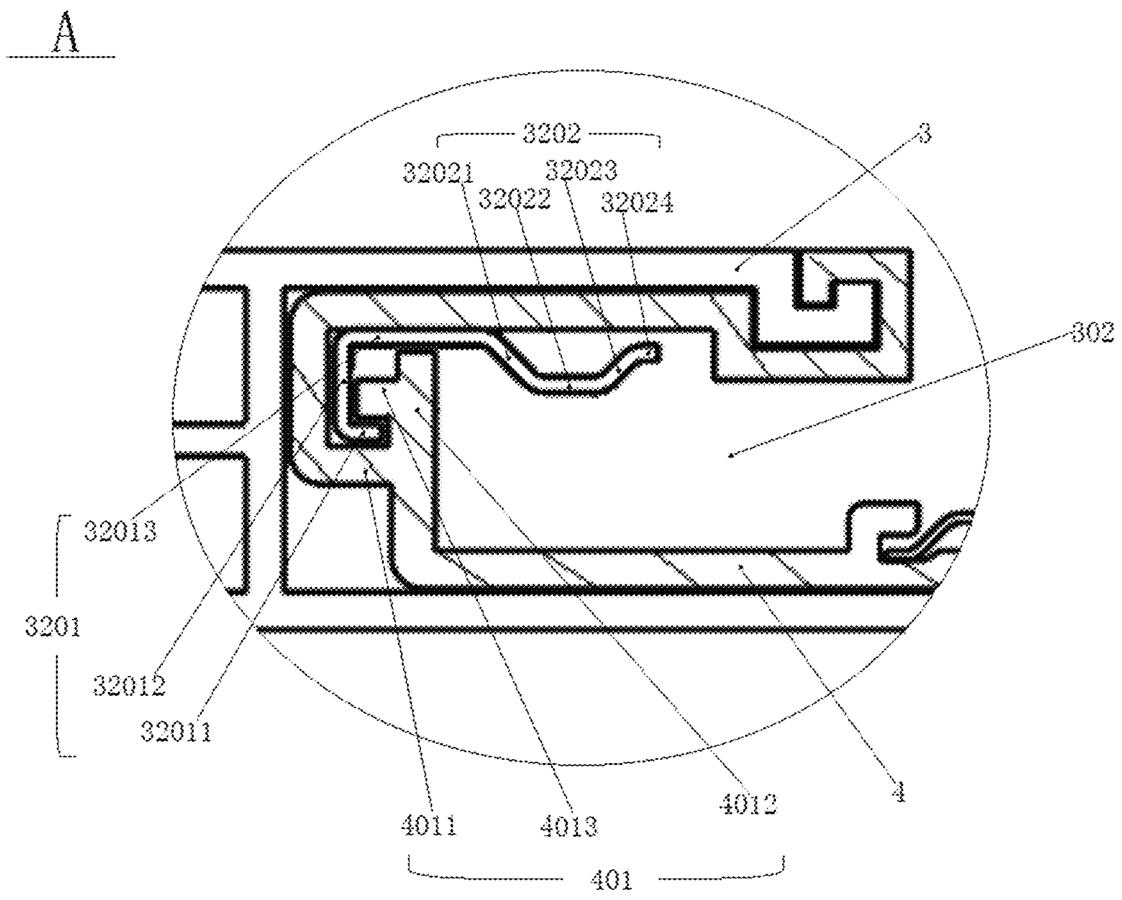
FIG. 18 is a partial enlarged view of a region A in FIG. 15 according to an embodiment of the disclosure.

Regarding the structural arrangement of the first conductive sheet 321 and the second conductive sheet 322 in the width direction, as an example, as shown in FIG. 18, each of the first conductive sheet 321 and the second conductive sheet 322 includes a connecting portion 3201 and an electrical contact portion 3202. The connecting portion 3201 is connected to the wall at the corresponding position of the accommodating cavity 302 in an insulating manner.

The electrical contact portion 3202 is a hollow convex structure, and a convex direction of the electrical contact portion 3202 faces the bottom wall of the accommodating cavity 30. Due to such arrangement, when the electrical contact portion 3202 is in contact with the power-taking portion of the electrical connector, due to the hollow convex structure thereof, the electrical contact portion has certain elasticity, which is beneficial to reduce the wear.

In an optional implementation, the electrical contact portion 3202 is an arc-shaped convex structure.

In an optional implementation, as shown in FIG. 18, the electrical contact portion 3202 includes a first support section 32021, a contact section 32022, and a second support section 32023, and the first support section 32021 and the second support section 32023 are both obliquely disposed.

A first end of the first support section 32021 is connected to the connecting portion 3201, and a second end of the first support section 32021 extends toward the bottom wall of the accommodating cavity 302 and is connected to a first end of the contact section 32022. A second end of the contact section 32022 is connected to a first end of the second support section 32023, and a second end of the second support section 32023 extends toward the top wall of the accommodating cavity 302. The contact section 32022 may be horizontal or arc-shaped.

The second end of the first support section 32021 extends toward the bottom wall of the accommodating cavity 302 and is connected to the first end of the contact section 32022. Besides, the first end of the second support section 32023 also extends toward the bottom wall of the accommodating cavity 302 and is connected to the second end of the contact section 32022, so that the electrical contact portions 3202 of the first conductive sheet 321 and the second conductive sheet 322 form a hollow convex structure, the convex direction of which faces the bottom wall of the accommodating cavity 302.

The bottom of the contact section 32022 is configured for electrical contact. Under the support of the first support section 32021 and the second support section 32023, a gap is formed between the contact section 32022 and the top wall of the accommodating cavity 302, so that the electrical contact portion 3202 has elasticity. Both the first conductive sheet 321 and the second conductive sheet 322 are metal sheets, which is beneficial to increase the elasticity of the electrical contact portion 3202.

The height of the gap between the contact section 32022 and the top wall of the accommodating cavity 302 is directly related to the inclination and length of the first support section 32021 and the second support section 32023. The inclination and length of the first support section 32021 and the second support section 32023 are designed differently to adaptively acquire different heights of the above gap.

Illustratively, the height of the gap between the contact section 32022 and the top wall of the accommodating cavity 302 ranges from 1.5 mm to 5 mm, for example, 2 mm, 2.5 mm, 3 mm, 3.5 mm, 4 mm, 4.5 mm, etc.

Taking the first conductive sheet 321 as an example, after the power-taking portion of the electrical connector has been in electrical contact with the bottom of the first conductive sheet 321 for multiple times, the bottom of the first conductive sheet 321 will be worn to a certain extent, and the bottom contact position of the contact section 32022 is caused to move up. In this case, in order to keep the power-taking portion of the electrical connector to be always in contact with the bottom of the first conductive sheet 321, when the first conductive sheet 321 is installed, the bottom contact position of the contact section 32022 is lowered by a certain distance from a normal contact position, so as to solve for the problem of upward movement of the bottom contact position of the contact section 32022 caused by the wear (the downward movement distance of the bottom contact position of the contact section 32022 is generally determined according to the wear thickness of the worn part at the bottom).

It can be seen that, based on the above structural design, when the power-taking portion of the electrical connector is in electrical contact with the bottom of the contact section 32022, since the electrical contact portion 3202 has elasticity, when the power-taking portion of the electrical connector is in contact with the bottom of the contact section 32022, the contact section 32022 is pressed upward to make it elastically deformed. In this way, even if the bottom contact position of the contact section 32022 moves down relative to the normal contact position, the contact section can still achieve smooth electrical contact with the power-taking portion of the electrical connector. After multiple electrical contacts, even if the bottom of the contact section 32022 is worn, the bottom contact position can still be maintained within the range of the normal contact position, so as to achieve normal electrical contact with the power-taking portion of the electrical connector.

Further, in the electrified guide rail according to the embodiment of the present disclosure, there is a gap between the second end of the second support section 32023 and the top wall of the accommodating cavity 302. For example, the height of the gap between the second end of the second support section 32023 and the top wall of the accommodating cavity 302 ranges from 1 mm to 2.5 mm. By disposing the above gap between the second end of the second support section 32023 and the top wall of the accommodating cavity 302, it is beneficial to increase the elasticity of the electrical contact portion 3202.

Further, in the electrified guide rail according to the embodiment of the present disclosure, as shown in FIG. 18, the electrical contact portion 3202 further includes a horizontal section 32024. A first end of the horizontal section 32024 is connected to the second end of the second support section 32023, and a second end of the horizontal section 32024 extends in a direction away from the contact section 32022. The horizontal section 32024 is parallel to the top wall of the accommodating cavity 302, and there is a gap between the horizontal section 32024 and the top wall of the accommodating cavity 302.

Exemplarily, the height of the gap between the horizontal section 32024 and the top wall of the accommodating cavity 302 ranges from 1 mm to 2.5 mm.

When the power-taking portion of the electrical connector is in electrical contact with the bottom of the contact section 32022 and presses the contact section 32022 upward, the horizontal section 32024 can be in contact with the top wall of the accommodating cavity 302. The top wall of the accommodating cavity 302 is configured to provide stable support for the horizontal section 32024, thereby preventing the electrical contact portion 3202 having elasticity from being deformed, which is beneficial to improve the structural stability of the electrical contact portion 3202.

For the Third Conductive Sheet 323

The third conductive sheet 323 is an E-pole conductive sheet, and the third conductive sheet 323 is connected to the bottom wall of the accommodating cavity 302, for example, may also be opposite to the opening 301.

The third conductive sheet 323 may not be provided with the above gap 3204 along the length direction, or may be provided with the above gap 3204 to achieve the purpose of weight reduction.

Figure 19:
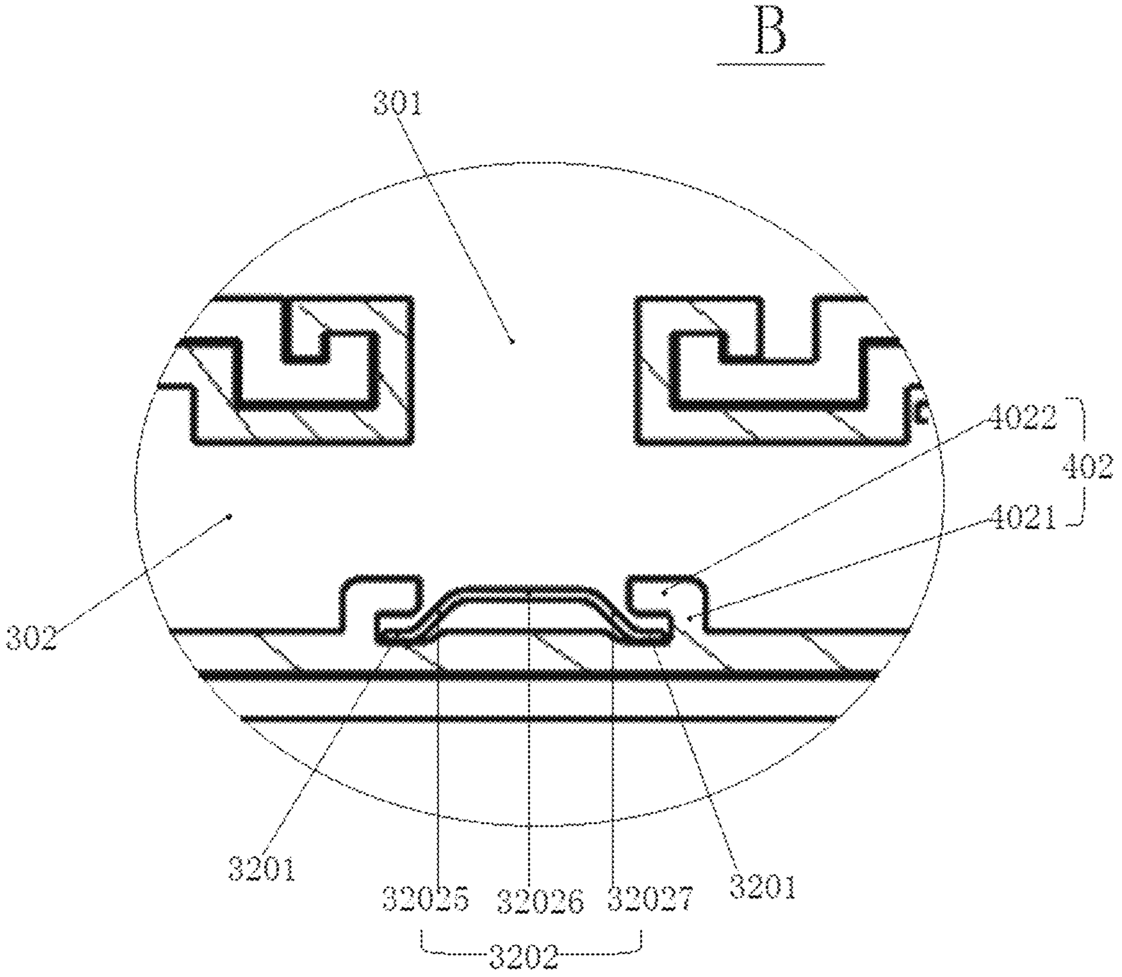
FIG. 19 is a partial enlarged view of a region B in FIG. 15 according to an embodiment of the disclosure.

In the width direction of the third conductive sheet 323, as shown in FIG. 19, the third conductive sheet 323 includes two connecting portions 3201 and an electrical contact portion 3202, and the two connecting portions 3201 are respectively connected to the two ends of the electrical contact portion 3202 in the width direction.

As an example, as shown in FIG. 19, the electrical contact portion 3202 of the third conductive sheet 323 includes a third inclined section 32025, an electrical contact section 32026, and a fourth inclined section 32027. A first end of the third inclined section 32025 is connected to one connecting portion 3201. A second end of the third inclined section 32025 extends in a direction away from the bottom wall of the accommodating cavity 302, and a second end of the third inclined section 32025 is connected to a first end of the electrical contact section 32026. A second end of the electrical contact section 32026 is connected to a first end of the fourth inclined section 32027. A second end of the fourth inclined section 32027 extends in a direction close to the bottom wall of the accommodating cavity 302, and the second end of the fourth inclined section 32027 is connected to the other connecting portion 3201. The electrical contact section 32026 may be horizontal (referring to FIG. 19), or may be arc-shaped.

With such an arrangement, the electrical contact portion 3202 of the third conductive sheet 323 forms a hollow boss structure, a convex direction of which faces the top wall of the accommodating cavity 302 (for example, faces the opening 301), so that the electrical contact portion 3202 of the third conductive sheet 323 has elasticity. The third conductive sheet 323 is a metal sheet, which is beneficial to increase the elasticity of the electrical contact portion 3202 thereof.

During application, the top of the electrical contact section 32026 is in electrical contact with the bottom of the power-taking portion of the electrical connector. Based on the above structure of the third conductive sheet 323, it can be ensured that the top of the electrical contact section 32026 still maintains good contact with the bottom of the power-taking portion of the electrical connector in the case of wear.

The connecting portion 3201 of each above conductive sheet is connected to the wall at the corresponding position of the accommodating cavity 302 in an insulating manner. When the material of the guide rail body 31 is an insulating material, for example, a high polymer resin material, a ceramic material, etc., at this time, the connecting portion 3201 may be directly connected to the wall at the corresponding position of the accommodating cavity 302.

When the material of the guide rail body 31 is a conductive material, for example, a metal material of aluminum alloy and the like, at this time, the electrified guide rail according to the embodiment of the present disclosure further includes an insulating partition 4. The connecting portion 3201 of each above conductive sheet is connected to the wall at the corresponding position of the accommodating cavity 302 through the insulating partition 4 to achieve the purpose of insulating connection.

Figure 20:
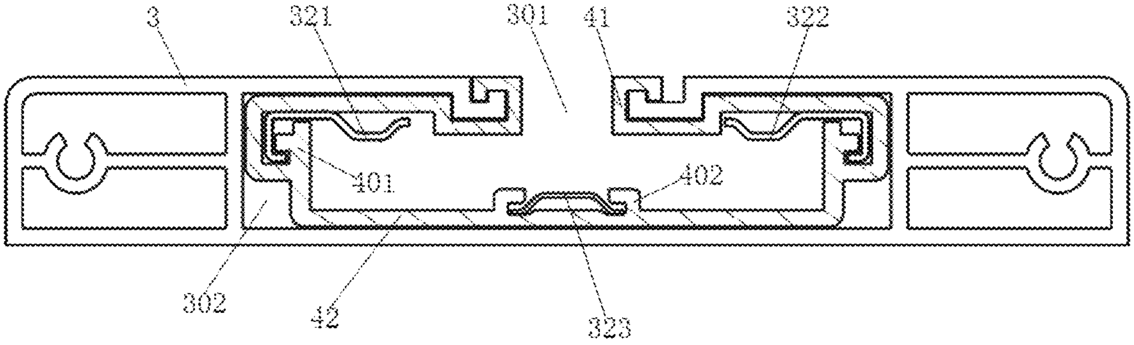
FIG. 20 is a cross-sectional view of another exemplary electrified guide rail according to an embodiment of the present disclosure.

In some optional implementations, as shown in FIG. 20, the insulating partition 4 includes a first cavity portion 41 having a first cavity and a second cavity portion 42 having a second cavity.

The first cavity of the first cavity portion 41 essentially belongs to the opening 301, and is configured to plug the power-taking portion of the electrical connector. Besides, the first cavity portion 41 is connected to the wall of the guide rail body 31 at both sides of the opening 301 in a clamping manner and is accommodated in the opening 301. Exemplarily, the top wall of the guide rail body 31 is provided with a clamping slot along the length direction. The top of the first cavity portion 41 is provided with a clamping block corresponding to the clamping slot along the length direction. The clamping block is clamped in the clamping slot to achieve the clamping connection between the first cavity portion 41 and the guide rail body 31.

The second cavity portion 42 is connected to the first cavity portion 41, and is accommodated in the accommodating cavity 302, and specifically, is accommodated inside a middle cavity of the accommodating cavity 302. The second cavity of the second cavity portion 42 essentially belongs to the accommodating cavity 302 and is configured to accommodate the first conductive sheet 321, the second conductive sheet 322 and the third conductive sheet 323. At this time, the connection between the connecting portion 3201 and the insulating partition 4 is essentially the connection between the connecting portion 3201 and the inner wall of the second cavity portion 42.

In one case, the connecting portion 3201 is directly connected to the wall of the accommodating cavity 302. Or, in another case, the connecting portion 3201 is directly connected to the insulating partition 4. The corresponding specific connection modes in these two cases may be the same.

In the following, the case where the electrified guide rail includes the insulating partition 4 is taken as an example to illustrate the connection mode of the connecting portion 3201 of each conductive sheet and the insulating partition 4.

For the connection between the connecting portions 3201 of the first conductive sheet 321 and the second conductive sheet 322 and the insulating partition 4:

In some optional implementations, as shown in FIG. 18, the connecting portions 3201 of the first conductive sheet 321 and the second conductive sheet 322 are bent. The inner wall of the insulating partition 4 has a side part clamping block 401. A bent clamping slot is formed between the side part clamping block 401 and the inner wall of the insulating partition 4. The connecting portion 3201 is embedded into the bent slot for fixing.

Further, for example, as shown in FIG. 18, the bent connecting portion 3201 of the first conductive sheet 321 and the second conductive sheet 322 includes a first horizontal connecting section 32011, a vertical connecting section 32012 and a second horizontal connecting section 32013 which are connected in sequence. The first horizontal connecting section 32011 and the second horizontal connecting section 32013 are disposed on the same side of the vertical connecting section 32012.

The first horizontal connecting section 32011 is connected to the lower end of the vertical connecting section 32012, and the second horizontal connecting section 32013 is connected to the upper end of the vertical connecting section 32012. Besides, the top wall of the second horizontal connecting section 32013 abuts against the inner side of the top wall of the insulating partition 4.

As an example, as shown in FIG. 18, the side part clamping block 401 includes a first horizontal clamping section 4011, a first vertical clamping section 4012, and a second horizontal clamping section 4013. A first end of the horizontal clamping section 4011 is connected to the inner side of the side wall of the insulating partition 4, and a second end of the first horizontal clamping section 4011 is connected to a first end of the first vertical clamping section 4012. A second end of the first vertical clamping section 4012 extends in a direction close to the top wall of the insulating partition 4, and there is a first gap between the second end of the first vertical clamping section 4012 and the top wall of the insulating partition 4. The second horizontal clamping section 4013 is disposed above the first horizontal clamping section 4011 and there is a second gap between the second horizontal clamping section 4013 and the first horizontal clamping section 401. A first end of the second horizontal clamping section 4013 is connected to the first vertical clamping section 4012. A second end of the second horizontal clamping section 4013 extends along a direction close to the side wall of the insulating partition 4, and there is a third gap between the second end of the second horizontal clamping section 4013 and the inner side of the side wall of the insulating partition 4.

The first gap, the second gap and the third gap cooperate to form the above bent clamping slot.

During application, the first horizontal connecting section 32011 is embedded into the second gap between the first horizontal clamping section 4011 and the second horizontal clamping section 4013. The vertical connecting section 32012 is embedded into the third gap between the second horizontal clamping section 4013 and the inner side of the side wall of the insulating partition 4. The second horizontal connecting section 32013 is embedded into the first gap between the first vertical clamping section 4012 and the inner side of the top wall of the insulating partition 4. In this way, the first horizontal connecting section 32011, the vertical connecting section 32012, and the second horizontal connecting section 32013 realize the simultaneous clamping connection with the side part clamping block 401.

When in installation, the first conductive sheet 321 and the second conductive sheet 322 enter from one of the ports of the accommodating cavity 302, so that the connecting portions 3201 of the first conductive sheet 321 and the second conductive sheet 322 are plugged into the clamping cavity formed by the side part clamping block 401. After the installation of the first conductive sheet 321 and the second conductive sheet 322 is completed, the cover plates are configured to block the two ports of the accommodating cavity 302 to protect respective components inside the accommodating cavity 302.

For the connection between the connecting portion 3201 of the third conductive sheet 323 and the insulating partition 4:

In some optional implementations, as shown in FIG. 19, the connecting portions 3201 of the third conductive sheet 323 are disposed at two opposite ends of the electrical contact portion 3202, and are a sheet structure extending in the horizontal direction. The inner side of the bottom wall of the insulating partition 4 has a bottom clamping block 402, and the connecting portion 3201 of the third conductive sheet 323 is connected to the bottom clamping block 402 in a clamping manner.

Exemplarily, the bottom clamping block 402 includes a second vertical clamping section 4021 and a third horizontal clamping section 4022. A first end of the second vertical clamping section 4021 is connected to the inner side of the bottom wall of the insulating partition 4. A second end of the second vertical clamping section 4021 is connected to a first end of the third horizontal clamping section 4022, so that the third horizontal clamping section 4022, the second vertical clamping section 4021 and the bottom wall of the insulating partition 4 cooperate to form a clamping cavity, and the connecting portion 3201 of the third conductive sheet 323 is limited in the clamping cavity.

When in installation, the third conductive sheet 323 enters from one of the ports of the accommodating cavity 302, and the connecting portions 3201 at both ends of the third conductive sheet 323 are plugged into the corresponding clamping cavity. After the installation of the third conductive sheet 323 is completed, the cover plates are configured to block two ports of the accommodating cavity 302 to protect respective components inside the accommodating cavity 302.

Figure 21:
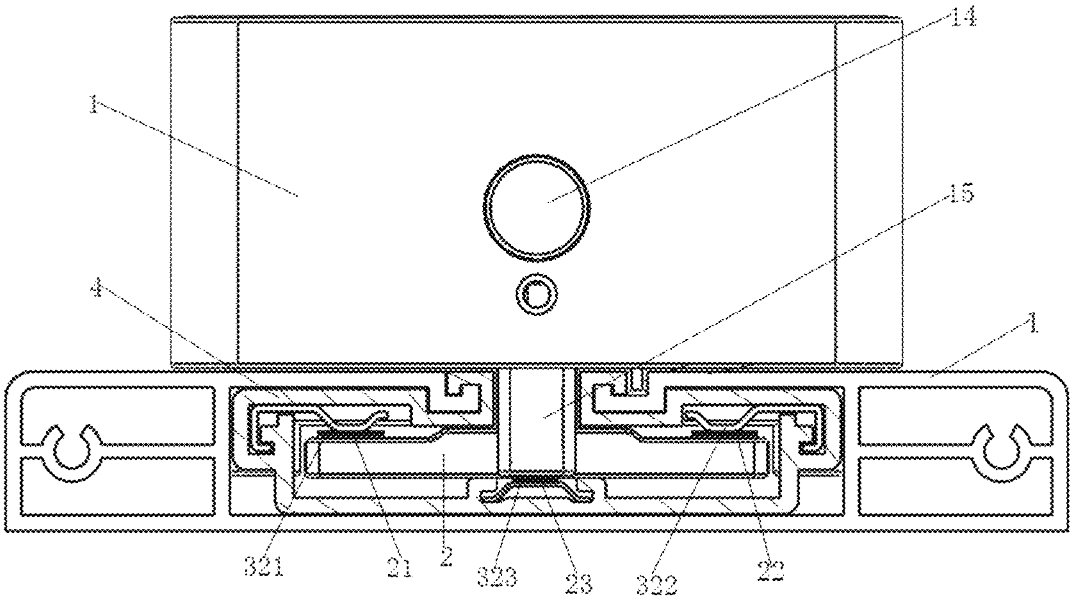
FIG. 21 is a cross-sectional view of an exemplary rail socket according to an embodiment of the disclosure.

In some optional implementations, as shown in FIG. 21, the first electrical contact structure 21 and the second electrical contact structure 22 of the power-taking portion 2 are respectively disposed on the top of the power-taking portion 2, and the third electrical contact structure 23 is disposed at the bottom of the power-taking portion 2 to facilitate electrical contact with the first conductive sheet 321, the second conductive sheet 322 and the third conductive sheet 323.

In the embodiment of the present disclosure, the first electrical contact structure 21 and the second electrical contact structure 22 are both disposed at the top position of the power-taking portion 2, and meanwhile are both disposed in the gap between the top of the power-taking portion 2 and the bottom of the socket portion 1. In this way, the first electrical contact structure 21 and the second electrical contact structure 22 are not easily touched, so that not only is electricity utilization safer, but also the first electrical contact structure 21 and the second electrical contact structure 22 are not easily contaminated, which helps to improve the service life of the adapter.

In some optional implementations, the power-taking portion 2 may be integrally formed by encapsulation. Due to such arrangement, the power-taking portion 2 has high strength and is not easily deformed, and it is also beneficial to reduce the thickness of the power-taking portion 2.

The term "first" or "second" used in the embodiments of the present disclosure is merely configured to describe but not denote or imply any relative importance. The term "a plurality of" means two or more, unless otherwise expressly provided.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. An adapter comprising a socket portion and a power-taking portion, wherein the power-taking portion is connected to a bottom of the socket portion, and the power-taking portion is configured to enter an electrified guide rail to take power;

the socket portion comprises a socket portion body, a fixed support, a locking member and an unlocking member;

the fixed support is disposed at a bottom of the socket portion body;

the locking member runs through the fixed support, the locking member and the power-taking portion are set independently from each other, and the locking member is configured to be limited within the electrified guide rail in a locked state to lock the adapter inside the electrified guide rail, and configured to be released from the electrified guide rail in an unlocked state; and the unlocking member is connected to the fixed support, and the unlocking member is configured to enable the locking member to be switched between the locked state and the unlocked state.

2. The adapter according to claim 1, wherein the locking member comprises a rotating portion, a connecting portion and a first locking portion;

the rotating portion runs through the fixed support and is rotatable;

a first end of the connecting portion is connected to a first end of the rotating portion disposed above the fixed support, and a second end of the connecting portion is connected to the unlocking member; and the first locking portion is connected to a second end of the rotating portion disposed below the fixed support, and the first locking portion is switched between the locked state and the unlocked state through rotating.

3. The adapter according to claim 2, wherein the first locking portion comprises a locking portion body and two locking blocks;

the locking portion body is connected to the second end of the rotating portion; and the two locking blocks are connected to opposite side walls of the locking portion body, and the locking blocks are stopped by an inner surface of a top wall of the electrified guide rail disposed on both sides of an opening in the locked state.

4. The adapter according to claim 3, wherein an end part of the locking block away from the locking portion body has a guiding surface; and the guiding surface is configured to act on the inner wall of the opening by contact, when the first locking portion enters the opening of the electrified guide rail, so that the first locking portion is rotated from the locked state to the unlocked state.

5. The adapter according to claim 2, wherein the unlocking member comprises a first operating portion and a first transmission portion;

the first operating portion is movably connected to a side wall of the fixed support; and a first end of the first transmission portion is connected to the first operating portion, and a second end of the first transmission portion is connected to the connecting portion.

6. The adapter according to claim 5, wherein a top of the fixed support has a stop block;

the unlocking member further comprises an elastic portion; and the elastic portion is limited between the connecting portion and the stop block, the elastic portion is configured to keep the first locking portion in the locked state, and when an external force acts on the first operating portion, the elastic portion is pressed and deformed, so that the first locking portion is rotated from the locked state to the unlocked state.

7. The adapter according to claim 2, wherein the adapter further comprises a guiding block which is connected to a bottom of the fixed support and is movable along a length direction of the electrified guide rail;

a wall of the guiding block has a first accommodating space and a second accommodating space;

the first accommodating space is configured to accommodate the power-taking portion; and the second accommodating space is configured to accommodate the first locking portion or the second locking portion.

8. The adapter according to claim 7, wherein in the unlocked state, the first locking portion or the second locking portion is hidden within the second accommodating space.

9. The adapter according to claim 1, wherein the locking member comprises a deforming portion and a second locking portion;

the deforming portion runs through the fixed support;

the second locking portion is connected to an end of the deforming portion disposed below the fixed support; and the deforming portion is capable of being elastically deformed under action of the unlocking member, so that the second locking portion is switched between the locked state and the unlocked state through extending and retracting movement.

10. The adapter according to claim 9, wherein the deforming portion comprises a top plate, a first side plate and a second side plate;

the first side plate and the second side plate are respectively connected to two opposite ends of the top plate, and there is a gap between the first side plate and the second side plate;

second locking portions are respectively connected to a first surface of the first side plate and a second surface of the second side plate;

wherein the first surface is a surface of the first side plate away from the gap and the second surface is a surface of the second side plate away from the gap.

11. The adapter according to claim 10, wherein the unlocking member comprises a second operating portion and a second transmission portion;

the second transmission portion is arc-shaped and disposed on the top of the fixed support, and the second operating portion is connected to an outside of the second transmission portion;

there are two unlocking members, and the deforming portion comprises a first deforming portion and a second deforming portion;

two ends of the second transmission portion of one unlocking member are respectively connected to a first surface of the first deforming portion and a first surface of the second deforming portion; and two ends of the second transmission portion of the other unlocking member are respectively connected to a second surface of the first deforming portion and a second surface of the second deforming portion.

12. A rail socket comprising an electrified guide rail and the adapter according to claim 1; wherein, a top and an inside of the electrified guide rail respectively have an opening and an accommodating cavity which extend along a length direction of the electrified guide rail; and the power-taking portion of the adapter is capable of being assembled into the accommodating cavity through the opening, and capable of rotating to a power-taking position in the accommodating cavity to take power.

13. The rail socket according to claim 12, wherein the electrified guide rail comprises a guide rail body, a first conductive sheet, a second conductive sheet and a third conductive sheet;

an inside of the guide rail body has the accommodating cavity extending along the length direction of the guide rail body, a top of the guide rail body has the opening extending along the length direction of the guide rail body, and the opening is communicated with the accommodating cavity;

the first conductive sheet and the second conductive sheet are respectively disposed on an inner side of a top wall of the accommodating cavity on both sides of the opening, and both extend along the length direction of the guide rail body, and bottoms of the first conductive sheet and the second conductive sheet are configured for electrical contact;

the third conductive sheet is disposed on an inner side of a bottom wall of the accommodating cavity and extends along the length direction of the guide rail body, and a top of the third conductive sheet is configured for electrical contact; and wherein one of the first conductive sheet and the second conductive sheet is an L-pole conductive sheet while the other is an N-pole conductive sheet, and the third conductive sheet is an E-pole conductive sheet.

14. The rail socket according to claim 13, wherein both the first conductive sheet and the second conductive sheet comprises a connecting portion and an electrical contact portion;

the connecting portion is connected to a wall of the accommodating cavity at a corresponding position in an insulating manner; and the electrical contact portion is a hollow convex structure, and a convex direction of the electrical contact portion faces the bottom wall of the accommodating cavity.

15. The rail socket according to claim 14, wherein the electrical contact portion comprises a first support section, a contact section, and a second support section, and both the first support section and the second support section are disposed obliquely;

a first end of the first support section is connected to the connecting portion, and a second end of the first support section extends toward the bottom wall of the accommodating cavity and is connected to a first end of the contact section; and a second end of the contact section is connected to a first end of the second support section, and a second end of the second support section extends towards the top wall of the accommodating cavity.

16. The rail socket according to claim 15, wherein there is a gap between the second end of the second support section and the top wall of the accommodating cavity.

17. The rail socket according to claim 15, wherein the electrical contact portion further comprises a horizontal section, a first end of the horizontal section is connected to the second end of the second support section, and a second end of the horizontal section extends along a direction away from the second support section; and there is a gap between the horizontal section and the top wall of the accommodating cavity.

18. The rail socket according to claim 14, wherein the electrified guide rail further comprises an insulating partition; and the connecting portion is connected to the wall of the accommodating cavity at a corresponding position through the insulating partition in an insulating manner.

19. The rail socket according to claim 18, wherein the connecting portion has a bent shape;

an inner wall of the insulating partition has a side part clamping block, and a bent clamping slot is formed between the side part clamping block and the inner wall of the insulating partition; and the connecting portion is embedded into the bent clamping slot to be fixed.

20. The rail socket according to claim 13, wherein both the first conductive sheet and the second conductive sheet comprise a plurality of conductive segments and a plurality of gaps, which are distributed along a length direction, and each of the plurality of gaps is disposed between two adjacent conductive segments.

* * * * *